US012259401B2

(12) United States Patent
Meijer et al.

(10) Patent No.: US 12,259,401 B2
(45) Date of Patent: Mar. 25, 2025

(54) FIBRE OPTIC ACCELEROMETER

(71) Applicant: SOMNI CORPORATION B.V., The Hague (NL)

(72) Inventors: Eric Meijer, The Hague (NL); Germán Enrique Knoppers, The Hague (NL); Yorick Koumans, The Hague (NL); Bastiaan Meulblok, The Hague (NL)

(73) Assignee: SOMNI CORPORATION B.V., The Hague (NL)

( * ) Notice: Subject to any disclaimer, the term of this patent is extended or adjusted under 35 U.S.C. 154(b) by 512 days.

(21) Appl. No.: 17/431,231

(22) PCT Filed: Feb. 18, 2020

(86) PCT No.: PCT/NL2020/050094
§ 371 (c)(1),
(2) Date: Aug. 16, 2021

(87) PCT Pub. No.: WO2020/171700
PCT Pub. Date: Aug. 27, 2020

(65) Prior Publication Data
US 2022/0137088 A1 May 5, 2022

(30) Foreign Application Priority Data

Feb. 18, 2019 (NL) ........................................ 2022593
May 29, 2019 (NL) ........................................ 2023232

(51) Int. Cl.
*G01P 15/093* (2006.01)
(52) U.S. Cl.
CPC .................................. *G01P 15/093* (2013.01)

(58) Field of Classification Search
CPC ..... G01P 15/093; G01P 15/08; G01D 5/35377
See application file for complete search history.

(56) References Cited

U.S. PATENT DOCUMENTS 4,322,829 A * 3/1982 Davis, Jr. ............... G01V 1/181
385/12
5,437,186 A 8/1995 Tschulena
(Continued)

FOREIGN PATENT DOCUMENTS

DE     102013101432 A1   8/2014
NL         2022593 B1    8/2020
(Continued)

OTHER PUBLICATIONS

International Search Report and Written Opinion for the International Patent Application No. PCT/NL2020/050094, mailed Jun. 18, 2020, 14 pages.

*Primary Examiner* — Xin Y Zhong
(74) *Attorney, Agent, or Firm* — KDW Firm PLLC

(57) ABSTRACT

Accelerometer for measuring acceleration along a measurement direction including a moving mass which is moving with respect to a frame member only along the measurement direction, a suspension system for suspending the moving mass in the frame member while substantially limiting movement of the moving mass along only the measurement direction, and an optical fibre that is connected at a fibre connection point that is coupled to the movable mass. The optical fibre is arranged between the moving mass and the frame member and includes a measurement section for measuring the movement of the moving mass along the measurement direction.

18 Claims, 15 Drawing Sheets

(56) References Cited

U.S. PATENT DOCUMENTS

| | | |
|---|---|---|
| 6,807,325 B1 | 10/2004 | Kraemmer et al. |
| 2003/0209076 A1 | 11/2003 | Miao et al. |
| 2006/0104561 A1* | 5/2006 | Ivtsenkov .............. G01H 9/004 |
| | | 385/13 |
| 2006/0236762 A1* | 10/2006 | Meyer ...................... G01H 9/00 |
| | | 73/514.26 |
| 2007/0193355 A1* | 8/2007 | Axelrod ................ G01P 15/125 |
| | | 73/514.32 |
| 2007/0193362 A1* | 8/2007 | Ferguson ........... G01K 11/3206 |
| | | 73/800 |
| 2015/0168442 A1 | 6/2015 | Hutchison |
| 2018/0156643 A1* | 6/2018 | Knoppers ............. G01L 5/0057 |
| 2019/0078949 A1* | 3/2019 | Hung ................. G01K 11/3206 |
| 2020/0088757 A1* | 3/2020 | Olivier ................... G01V 1/184 |

FOREIGN PATENT DOCUMENTS

| | | | | |
|---|---|---|---|---|
| WO | 0114840 A1 | 3/2001 | | |
| WO | 2016182428 A1 | 11/2016 | | |
| WO | WO-2016182431 A1 * | 11/2016 | ......... | G01D 5/35316 |
| WO | 2020171700 A1 | 8/2020 | | |

* cited by examiner

FIBRE OPTIC ACCELEROMETER

This is a national stage application filed under 35 U.S.C. § 371 of pending international application PCT/NL2020/050094, filed Feb. 18, 2020, which claims priority to Netherlands Patent Application No. NL 2022593, filed Feb. 18, 2019, and also claims priority to Netherlands Patent Application No. NL 2023232, filed May 29, 2019, the entirety of which applications are hereby incorporated by reference herein.

The present invention relates to a fibre optic accelerometer and a method of manufacturing a fibre optic accelerometer.

Traditional electrical sensors generate electrical signals that are transported to an interrogator for converting the electrical signals to the quantity that is to be determined. These electrical sensors are however sensitive to electromagnetic interference, caused for instance by high voltage electricity, thereby leading to substantial amounts of noise in the measurements. Fibre optic sensors are, however, highly suitable for use in these types of applications, as optical signals are generated which are transported through optical fibre that do not conduct electricity, nor do they suffer from electromagnetic interference. Fibre optic sensors are used in a wide variety of different sensors measuring strain, pressure, temperature and even acceleration. Fibre optic accelerometers are highly suitable for measuring vibrations on, or near, high voltage equipment, such as to measure vibrations on electric current collectors, so called pantographs, arranged on top of electric trains.

Fibre optic sensors typically convert the quantity that is to be measured in such a way that a (tensile) strain variation is imposed on an optical fibre. For determining the imposed strain, a measurement section, such as a Fibre Bragg Grating, and an input spectrum of light in the fibre are provided. By measuring a change of the spectrum on the opposing side of the fibre, or by measuring a reflected spectrum of light, the imposed strain can be determined.

Fibre optic accelerometers typically use the same principle. An optical fibre is coupled to a mass that is movably arranged on a frame member such as a housing and as a result of imposed accelerations, the moving mass will exert an inertia force on the fibre, which introduces a strain in the fibre. The amplitude of the strain is thereby directly related to the amplitude of the acceleration that is measured. In case of more sensitive accelerometers, a direct coupling between the moving mass and the fibre, whereby the movement of the moving mass is equal to the elongation of the fibre, will not lead to a sensor with satisfactory properties. One could of course consider to use a bigger mass, such that the inertia force and hence the strain introduced in the fibre increases as well. This approach has its limitations nonetheless, as the increased mass will typically lower the eigenfrequency of the accelerometer itself and thereby limit the frequency range it can reliably measure.

In order to alleviate some of these issues, it has been proposed in the prior art to apply a lever mechanism to the moving mass to induce greater strains in the optical fibre. Thereby the moving mass has been pivotally coupled to the housing on one end of the moving mass and the fibre is coupled to the moving mass at a distance of the pivoting point, such that a lever effect is obtained. Hereby an improved sensitivity of the accelerometer is obtained. However, as not only the mass of the moving mass, but also its inertia plays a significant role, these sensors prove to be hard to calibrate and have a nonlinear acceleration-strain characteristic, thereby significantly reducing the range of the amplitude of accelerations that can be accurately measured. Secondly, due to pivotally mounting the moving mass, cross-talk between translational and rotational accelerations can become an issue that deteriorates the performance of these accelerometers even further. Cross-talk, or cross-axis sensitivity, is a measurement error due to the fact that the accelerometer responds to accelerations in a direction other than its measurement direction. Thereby, part of the output signal that the accelerometer generates originates from accelerations in directions other than the measurement direction, thus decreasing the accuracy and performance of the accelerometer and the measurements taken by the accelerometer.

An alternative to the accelerometer is disclosed in international patent application WO 2016/182428 A1 that discloses an optical sensor device comprising a reference body and at least one sensing transducer. The sensing transducer is arranged for moving relative to the reference body in response to an input action. The device further comprises an optical fibre and one or more transmission arms. The optical fibre comprises an intrinsic fibre optic sensor and is connected with a first connecting part to a first transmission arm and with a second connecting part to an element exterior to the first transmission arm. The first and second connecting parts are on either side of the intrinsic fibre optic sensor. A base of the first transmission arm is connected at a first part with the reference body and with a second part with the sensing transducer. The optical fibre is connected at a location along the first transmission arm remote from the base.

It is a goal of the present invention, next to other goals, to obtain a fibre optic accelerometer that allows for accurate vibration measurements over a large frequency range and/or a large range of amplitudes of acceleration, wherein at least one of the above mentioned problems is at least partially alleviated.

This goal, amongst other goals, is met by an accelerometer for measuring acceleration along a measurement direction, wherein the accelerometer comprises:
  a moving mass which is moving with respect to a frame member only along the measurement direction;
  a suspension system for suspending the moving mass in the frame member while substantially limiting movement of the moving mass along only the measurement direction;
  an optical fibre that is, preferably, connected at a fibre connection point that is coupled to the movable mass and, wherein the optical fibre is arranged between the moving mass and the frame member, wherein the optical fibre comprises a measurement section for measuring the movement of the moving mass along the measurement direction.

By applying such an arrangement of the mass and suspension system, an accelerometer with an reduced cross-axis sensitivity is obtained. This is achieved as the parts that account for most of the mass that is associated to moving parts in the system, i.e the moving mass and the suspension system, and preferably the fibre connection point, are arranged to move substantially only in the measurement direction and are thereby arranged such that very little movement, preferably no movement, of the moving mass in the (translational) directions other than the measurement direction is possible. Vibrations, or accelerations, in the directions perpendicular to the measurement direction, that lead to inertial forces acting on the moving mass in the perpendicular directions, lead to little, or preferably substantially no, relative accelerations and thus movements between the moving parts, i.e the moving mass, and the frame member. Instead the inertial forces acting on the moving parts in the perpendicular directions are effectively transferred to the frame member of the accelerometer, preferably by means of the suspension system. The suspension system thereby blocks substantially any movement of the mass in directions other than the measurement direction.

The measurement section in the optical fibre is typically arranged for measuring a strain of the optical fibre. The strain induced in the optical fibre leads to a signal, which will be interpreted as accelerations. In the accelerometer, this strain is induced through a relative motion between the fibre connection point and the connection point of the fibre with the frame member. Accelerations imposed on the accelerometer in the perpendicular directions do, substantially, not, or hardly, lead to accelerations and motions of the moving mass. Relative motion between the fibre connection point and the connection point of the fibre with the frame member, due to accelerations in the perpendicular directions, is thus negligible (or substantially zero), such that an accelerometer with a minimal, or negligible, or at least reduced cross-axis sensitivity is obtained. This leads to accurate and reliable acceleration measurements when using such an accelerometer. It is noted that the optical fibre can comprise multiple measurement sections that can have different purposes. For instance, an optical fibre can comprise a plurality (for instance two, three, four, etc.) measurement sections that are arranged for measuring the movement of the moving mass. Furthermore, a measurement section can be arranged to measure the temperature for allowing one to compensate for the effect of temperature variations, such as an additional strain variation or change in reflectivity of the fibre.

In a preferred embodiment, a transmission system comprising at least one pivoting arm coupled between the moving mass and the optical fibre for transmitting the movement of the moving mass to the optical fibre, wherein the optical fibre is connected to the pivoting arm at a fibre connection point and wherein, preferably, the transmission system is arranged such that movement of the fibre connection point is substantially limited to a movement in a direction parallel to the measurement direction.

By applying such an arrangement of the mass and transmission system, an accelerometer with an improved, or at least tunable, sensitivity is obtained, as the optical fibre is not directly coupled with the mass, while at the same time reducing the cross-axis sensitivity.

This is achieved as the parts that account for most of the mass that is associated to moving parts in the system, i.e. the moving mass and the pivoting arm (or, at least the fibre connection point on the pivoting arm), are arranged to move substantially only in the measurement direction and are thereby arranged such that very little movement, preferably substantially no movement, of the moving mass and of the pivoting arm in the (translational) directions other than the measurement direction is possible. Vibrations, or accelerations, in the directions perpendicular to the measurement direction, that lead to inertial forces acting on the moving mass and the pivoting arm in the perpendicular directions, lead to little, or preferably substantially no, relative accelerations and thus movements between the moving parts, i.e. the moving mass and the pivoting arm, and the frame member. Instead the inertial forces acting on the moving parts in the perpendicular directions are effectively transferred to the frame member of the accelerometer. The transmission system may hereto comprise a suitable linkage system.

The measurement section in the optical fibre is typically arranged for measuring a strain of the optical fibre. The strain induced in the optical fibre leads to a signal, which will be interpreted as accelerations. In the accelerometer, this strain is induced through a relative motion between the fibre connection point on the pivoting arm and the connection point of the fibre with the frame member. Accelerations imposed on the accelerometer in the perpendicular directions do, substantially, not, or hardly, lead to accelerations and motions of the moving mass and the pivoting arm (or, at least the fibre connection point on the pivoting arm). Relative motion between the fibre connection point on the pivoting arm and the connection point of the fibre with the frame member, due to accelerations in the perpendicular directions, is thus negligible (or substantially zero), such that an accelerometer with an minimal, or negligible, or at least reduced cross-axis sensitivity is obtained. This leads to accurate and reliable acceleration measurements when using such an accelerometer.

In a preferred embodiment the transmission system is arranged to limit movement of the fibre connection point only upon movement of the moving mass in the measurement direction. The moving mass is arranged to be substantially only movable in the measurement direction, thereby remaining substantially stationary when accelerations in the perpendicular directions are imposed on the accelerometer. As the fibre connection point is arranged to only move if the moving mass moves, no strains are induced in the measurement section of the optical fibre, thereby leading to a minimal cross-talk in the accelerometer. In other words, the transmission system is arranged such that only when the moving mass moves in the measurement direction, the fibre connection point moves, preferably also only in the measurement direction. It is then preferred if the fibre connection point then only moves in the measurement direction. In an alternative embodiment, the fibre connection point however moves in another direction, but only upon movement of the moving mass in the measurement direction.

In a preferred embodiment the optical fibre is aligned along the measurement direction. As the fibre connection point is arranged in a direction parallel to the measurement direction, aligning the optical fibre, or at least the part of the optical fibre that is arranged between the pivoting arm and the frame member, along the measurement direction leads to an optimal strain induction in measurement section of the optical fibre. Thereby, the sensitivity of the accelerometer is increased.

The pivoting arm is arranged, in a preferred embodiment, as a lever, such that a movement of the moving mass in the measurement direction results in a larger movement of the fibre connection point in the measurement direction. The pivoting arm has, preferably, a leverage of at least 2, more preferably at least 5, even more preferable at least 10. By arranging the pivoting arm as a lever, an induced movement of the mass can be, through the use of the pivoting arm, amplified (or even reduced) to the fibre connection point. Thereby, the sensitivity of the accelerometer can be increased (or decreased) to meet specification. In addition, by arranging the lever to have a leverage of more than 1, the effective stiffness of the fibre, as acting on the moving mass, is increased. An increased effective stiffness, when not changing the mass, leads to an increased eigenfrequency of the moving mass that is suspended in the frame member. The increased eigenfrequency leads to an increase frequency range wherein the accelerometer can be (accurately) used.

Hence, an increased leverage can lead to an increased sensitivity and an increase frequency range for measurements.

In a preferred embodiment the pivoting arm is pivotally connected to the frame member at a second point of the pivoting arm, wherein the pivotal connection is arranged such that upon pivoting of the pivoting arm, the fibre connection point moves substantially parallel to the measurement direction. Hereby a relatively simple and robust transmission system is obtained, for which only a single pivoting arm would be required. In addition, as the angle with which the pivoting arm is arranged to pivot is relatively small, the pivoting arm can be positioned substantially perpendicular, or at a small angle (e.g. less than 15 degrees), such that the fibre connecting point moves substantially parallel to the measurement direction upon pivoting of the pivot arm.

In a preferred embodiment, the pivotal connection of the pivoting arm with the frame member is arranged such that a virtual line drawn from the centre of gravity of the pivoting arm to the pivotal connection is substantially parallel to a second direction, wherein the second direction is perpendicular to the measurement direction and to a pivot axis of the pivotal connection of the pivoting arm. By ensuring that pivotal connection between the frame member and the pivoting arm is arranged such that, when drawing a virtual line between them, this virtual line is substantially parallel to the second direction, that is substantially perpendicular to both the measurement direction and the pivot axis, any inertial forces, due to imposed accelerations in the second direction, working on the pivoting arm in the second direction will substantially not create a torque around the pivotal connection. As substantially no torque is generated, the pivoting arm will not displace due to the accelerations in the second direction and no strain is induced on the optical fibre. Hence, the cross-axis sensitivity is even further reduced.

In a preferred embodiment of the accelerometer, the coupling between the moving mass and the pivoting arm is arranged such that a virtual line drawn from the centre of gravity of the moving mass to the coupling is substantially parallel to the measurement direction. Hereby, substantially no torque around the coupling point between the moving mass and the pivotal connection is generated when acceleration in the measurement direction are imposed on the accelerometer.

Preferably, the coupling of the moving mass and the pivoting arm and/or a connection between the pivoting arm and the frame member comprises a flexible hinge that is arranged to only pivot around a single pivot axis and/or a push-rod that is arranged between the moving mass and the pivoting arm, wherein a connection between the push-rod and the moving mass, and/or a connecting between the push-rod and the pivoting arm comprises a hinge, preferably a flexible hinge, for allowing relative rotations between the moving mass and the pivoting arm. By using a push-rod the pivoting arm and moving mass can be positioned at a distance from each other, such that, in use, the moving mass and pivoting arm cannot accidentally contact each other. Flexible hinges allow for relative rotations between the different parts of the accelerometer, without having to accommodate relative rotations in the hinges. Relative rotations within the hinges, i.e. between the different parts that are allowed to rotate relatively to a mutual rotation axis, typically suffer from friction and/or stick slip behaviour, which affects the durability and accuracy of the accelerometer negatively. By forming the flexible hinge like a leaf-spring, such that an elongated beam is obtained with a cross-section, wherein a first dimension of the cross-section is substantially smaller than a second dimension of the cross-section, the flexible hinge will have a much lower bending stiffness in the direction of the first dimension. Hereby, a flexible hinge is obtained that can substantially only pivot around a single pivot axis, wherein the pivot axis is substantially parallel to the second dimension of the cross-section, while at the same time functioning as a push-rod.

In a preferred embodiment, the pivoting arm comprises recesses, or holes, in a centre of the pivoting arm and/or wherein the pivoting arm comprises stiffening protrusions for increasing the bending stiffness of the pivoting arm in the measurement direction. The stiffening protrusions can for instance be formed as a ridge-like feature that extends outwardly, substantially parallel to the measurement direction, from an upper and/or lower surface of the pivoting arm. Additionally, or alternatively, the pivoting arm can be thicker at the edges of the pivoting arm when compared to the centre of the pivoting arm. Such construction features lead to an increased stiffness to mass ratio of the pivoting arm. If the pivoting arm is too flexible, the arm will bend rather than displace the fibre connection point, which leads to a reduction in the sensitivity of the accelerometer. An increase in stiffness thereby improves the sensitivity of the accelerometer. As, at the same time, the mass of the pivoting arm is reduced, cross-axis sensitivity is reduced, which leads to an increase in the accuracy. Also, by reducing the mass of the arm with respect to the moving mass, calibration of the sensor will become easier.

In an alternative preferred embodiment, the fibre connection point is arranged on the moving mass, such that the optical fibre is connected (e.g. directly coupled and/or directly fixed) to the moving mass. This, for instance, enables to provide for a low-frequency accelerometer. By, for instance, applying a relatively large moving mass, an increased sensitivity for low-frequencies is obtained and due to the relatively larger amplitudes of motion associated to these low frequencies, amplifications of the movement by means of a transfer mechanism is not required, such that a direct coupling between the fibre and the mass can be used. This allows for a simple and robust low-frequency accelerometer, which has low cross-axis sensitivity (i.e. reduced cross-talk).

In a preferred embodiment, the moving mass comprises a channel running substantially parallel to the measurement direction, wherein the channel is arranged for receiving the optical fibre and comprises the fibre connection point. Hereby, it is enabled to accurately and precisely position the optical fibre with respect to the mass.

In a preferred embodiment of the accelerometer, the optical fibre is connected to the moving mass at at least two fibre connection points, wherein the second fibre connection point is arranged at a predefined distance, as seen along the measurement direction, of the first fibre connection point. Securing the fibre at two different locations to the mass allows for aligning the optical fibre with respect to the mass in such a manner that the optical fibre is less prone to rotate around the connection points. It is further preferred if the optical fibre is also connected to the mass at positions in between the fibre connection points, by means of for instance a line connection that spans between the fibre connection points can be used to also effectively distribute the connection forces acting between the mass and the fibre along the connection line.

In a preferred embodiment, the fibre connection point is arranged at a predefined distance with respect to a centre of the moving mass, as seen along a direction substantially perpendicular to the measurement direction. Hereby, more freedom is obtained to route the optical fibre through the accelerometer. For instance, as the boundary conditions of the moving mass are hereby not fully symmetric (as seen in a direction perpendicular to the measurement direction) around the centre of the mass, inertial moments can be generated on the moving mass while measuring accelerations in the measurement direction. Nonetheless, as the moving mass is preferably arranged, preferably by use of the suspension system, to only move in the measurement direction, these inertial moments will lead to negligible, or substantially no, cross-axis sensitivity.

It is preferred that the fibre is connected (i.e. directly connected, directly coupled and/or directly fixed) to a first part of the frame member and wherein the measurement section is arranged on a first part of the fibre in between the fibre connection point and the first part of the frame member. Upon movement of the fibre connection point, the optical fibre will, for instance, elongate, which can be measured by the measurement section arranged on the first part. Preferably, the first part of fibre is mounted with a certain amount of pre-stress, such that, for instance, contractions of the first part of the fibre can also be measured.

In a preferred embodiment, the fibre is connected (i.e. directly connected, directly coupled and/or directly fixed) to a second part of the frame member, different from the first part of the frame member, and wherein an additional measurement section is arranged on the second part of the fibre in between the fibre connection point and the second part of the frame member, such that the fibre spans from the first part of the frame member to the fibre connection point and subsequently to the second part of the frame member and the fibre connection point is between the first and second parts of the frame member.

This specific arrangement of the optical fibre results in more accurate measurements. Upon movement of the moving mass in the measurement direction the fibre connection point (that can, for instance be arranged directly on the moving mass, or on, for instance, a pivoting arm of the transmission system) moves with the mass, thereby one section will contract, while another section will elongate. Or in other words, one of the measurement section and additional measurement section will contract, whereas the other of the measurement section and additional measurement section elongates. For instance, in combination with Fibre Bragg Grating arranged in the measurement sections, this results in a combined increase of the pitch in the FBG arranged on one side, and a decrease of the pitch of the FBG on the other side. As a result, the wavelengths of the optical signal in the fibre, which are reflected respectively by the respective measurement section and additional measurement section, will likewise change. The wavelength of the reflection of the one of the measurement section and additional measurement section, as a result of the decrease in tension, will likewise decrease, and the wavelength of the reflection of the other of the measurement section and the additional measurement will increase with a same amount due the change in tension, thereby effectively doubling the signal associated to a certain movement of the mass.

The first and second parts of the fibre have a certain stiffness, which in the above described arrangement act as springs in parallel, thereby doubling the effective stiffness that the mass experiences from the optical fibre. This doubling of the stiffness results in a higher resonance frequency of the accelerometer itself, as it is effectively a mass-spring system. As the resonance frequency of the accelerometer limits the bandwidth in which it can accurately be used, an increased resonance frequency also results in an increase of the bandwidth of the accelerometer at the same time.

However, a certain (inertia) force results in this double-stiffness setup in a displacement which is less when compared to when the fibre is only connected to a first part of the frame member and wherein the measurement section is arranged on a first part of the fibre in between the fibre connection point and the first part of the frame member. Nonetheless, as is described above, the signal is also effectively doubled. Thereby, one thus obtains an accelerometer having a higher bandwidth, while reducing, or even avoiding, the adverse effect of a reduced sensitivity.

In addition, this specific arrangement of measurement sections at both sides of the fibre connection point allow for compensation of unwanted effects, for instance related to aging. During its lifetime the reflection index of the fibre, and thereby of the Fibre Bragg Gratings, slowly changes due to aging. This aging causes a shift of the frequencies that are reflected by the Fibre Bragg Gratings. However, as the specific arrangement of measurement sections at both sides of the fibre connection point allows for taking relative measurements, the effect of these slow changes can automatically be compensated for in the interpretation (i.e. processing) of the reflected signals.

It is furthermore noted that the advantages of the above noted specific arrangement can also be applied in other types of accelerometers, wherein the moving mass is not only moving with respect to the frame member in the measurement direction.

As other means are also available for arranging the accelerometer, such that the moving mass is moving with respect to a frame member only along the measurement direction, an accelerometer according to a preferred embodiment can also be arranged without the suspension system for suspending the moving mass in the frame member while substantially limiting movement of the moving mass along only the measurement direction.

In a further preferred embodiment of the accelerometer, the suspension system comprises two flexure guide systems, each comprising a leaf spring, extending between the frame member and the moving mass, and wherein, preferably, the flexure guide systems are arranged parallel with respect to each other and the moving mass is allowed to move through a bending of the flexure guide systems, particularly the leaf springs, in the measurement direction. By arranging the leaf springs, that are comprised in the flexure guide systems, such that they are allowed to substantially only bend in a direction parallel to the measurement direction and positioning them, when seen in the measurement direction, such that they are spaced apart at a certain distance, the moving mass is substantially limited in moving in other directions than the measurement direction.

It is further preferred if the flexure guide systems each comprise two leaf springs that are arranged in series and wherein, at least the first, leaf springs of the, preferably all, flexure guide systems have substantially the same stiffness and/or thickness, and wherein the first leaf springs of the flexure guide systems are mutually spaced apart in the measurement direction. Single leaf springs will in bending, due to the geometrically non-linear effects, show a slight parasitic movement in a direction perpendicular to the measurement direction. This effect tends to increase with larger deformations of the leaf springs. By arranging leaf springs with substantially the same stiffness in series, the total bending for accommodating the movement of the movable mass in the measurement direction is effectively divided over the two leaf spring elements, such that the bending per leaf spring is reduced, thereby also reducing the parasitic movement in a direction perpendicular to the measurement direction. Hereby a reduction in cross-axis sensitivity is obtained. In addition, unwanted rotational movement of the moving mass can be effectively suppressed if the first leaf springs of the flexure guide systems are mutually spaced apart in the measurement direction.

Additionally, or alternatively the flexure guide systems are preferably arranged in a U-shape and each comprise two leaf springs forming the legs of the U and wherein an intermediate element, having a substantial higher bending stiffness when compared to the leaf springs, is arranged between the legs forming the bottom of the U, and wherein a free end of the first leg of the U is connected to the frame member and a free end of the second leg of the U is connected to the moving mass. By arranging, in a flexure guide system, at least two equal leaf springs in series a U-formation, this result in effectively canceling any parasitic movement of one leaf spring by the opposite and equal parasitic movement of the other leaf spring, thereby resulting in only allowing the movement of the moving mass in the measurement direction. It is even more preferred if the intermediate elements of the two flexure guide systems are coupled by means of a coupling element having a substantial higher bending stiffness when compared to the leaf springs. Hereby, the effect of minor production tolerances, resulting in minor variation of the bending stiffness of the leaf springs, can be significantly reduced, resulting in a suspension system that is more robust to production tolerances.

In a preferred embodiment, a first leaf spring is arranged to be substantially orthogonal to the measurement direction and wherein a second leaf spring of the flexure guide system is arranged at an angle with respect to the first leaf spring, such that the second leaf spring is arranged to be substantially parallel to, or at an acute angle with, the measurement direction. Hereby, the first leaf springs are allowed to bend in the measurement direction, whereas the second leaf springs allow for a larger spacing, as seen in the measurement direction, between the first leaf springs, such that they can be arranged to be flush with outer ends of the moving mass. Also, unwanted rotational displacements of the moving mass, can be effectively constrained by the first leaf springs, thus further reducing cross-talk. It is then preferred if the second leaf spring of at least one flexure guide system is arranged with a stiffening element that is arranged to block a bending of the flexure guide system in a direction other than the measurement direction. Hereby, the stiffened section effectively prevents the moving mass from moving in a sideward direction that is orthogonal to the measurement direction, thereby further reduction the cross-axis sensitivity.

In a preferred embodiment, the accelerometer comprises an additional suspension system, wherein the suspension systems are arranged on opposite sides of the moving mass and are substantially mirrored over a line, or plane, of symmetry that is substantially parallel to the measurement direction. Hereby a more reliable suspension system is obtained. Additionally, or alternatively, the accelerometer comprises a number of suspension systems, wherein the number of suspension systems is arranged around a central axis of the moving mass that is substantially parallel to the measurement direction and around an outer circumference of the moving mass. As the suspension systems are arranged such that the moving mass only moves in the measurement direction, the moving mass is more reliably constrained to only move in the measurement direction. In addition, a suspension system has a predefined stiffness in the measurement direction, by applying a number of suspension systems, the stiffness in the measurement direction can be varied, such that the technical specifications, such as frequency bandwidth, sensitivity, etc., can be varied.

It is further preferred if the number of suspension systems is at least three, preferably five, and wherein the suspension systems are arranged such that the arrangement of the number of suspension systems is substantially symmetric over at least one line, or plane, of symmetry that is substantially parallel to the measurement direction. Hereby, the suspension systems are substantially equally divided around the mass, such that unwanted motion of the moving mass is minimized, while at the same time obtaining a compact configuration of the accelerometer. In a preferred embodiment, the accelerometer comprises an in- and/or outlet section arranged for transferring optical signals to external optical wiring, wherein the optical fibre is routed substantially stress-free from the connection with the pivoting arm to the in- and/or outlet section. Any effect of motions or forces applied to the external wiring and the outlet section of the accelerometer can hereby be, at least partially, isolated from the measurement section of the optical fibre. External disturbances to the measurement are hereby further reduced, whereby the accuracy and reliability of the accelerometers is increased. It is further preferred if the pivoting arm faces a first side of the frame member and wherein the in- and/or outlet is arranged on a side of the frame member different from the first side, such that a routing of the optical fibre comprises a J-shaped section. The slack in the optical fibre ensures that the optical fibre is routed substantially stress-free and thereby acts as an isolator for externally applied stresses and/or motions at the in- and/or outlet section.

Preferably, the measurement section comprises a Fibre-Bragg Grating (FBG). Fiber Bragg gratings can relatively easily be manufactured in optical fibres, while allowing for accurate measurements. In a preferred embodiment a secondary measurement section is arranged on a part of the optical fibre arranged for not measuring a movement of the moving mass and/or pivoting arm and wherein the secondary measurement section is arranged for measuring a temperature. Hereby, a temperature correction can be applied for converting the optical signals to measured accelerations. In addition, if FBGs are employed, multiple FBGs can be provided in a single optical fibre. By varying the grating period of the FBGs, each FBG works with a different frequency band in the light spectrum, thereby enabling that the measurements of the different FBGs can be separated by means of signal processing applied to the reflected light that is captured. A suitable measurement unit can be configured to this end.

In a preferred embodiment, the moving mass comprises a moving mass holder and a main moving mass, wherein the moving mass holder is arranged for fixedly holding the main moving mass and wherein the moving mass holder is coupled to the transmission system and, preferably, the suspension system. By varying the mass of the moving mass, the technical specifications, such as frequency bandwidth, sensitivity, etc., can easily be varied. As the main moving mass can be made from different materials having different properties as compared to the moving mass holder and/or the remainder of the accelerometer, the amount of mass can easily be varied. Suitable materials for the main moving mass are for instance metals, such as steel, brass, tungsten, plastics, for instance comprising different fillers and/or glass. Plastics and/or glass have the additional benefit that they are insensitive to magnetic and/or electrical fields.

In a preferred embodiment of the accelerometer, a combination of at least two of the frame member, moving mass, suspension system and transmission system is monolithic. By forming the combined parts of the accelerometer, or at least some parts of the system, integrally, tedious assembly work is prevented. Also, it allows for integrally forming flexible hinges, whereby the accuracy of the accelerometer is improved.

Preferably, a combination of at least two of the frame member, moving mass, suspension system and transmission system is formed from a single piece of material by means of electro discharge machining. Electro discharge machine allows for high-precision removal of material, such that the accelerometer, or at least parts of it, can be integrally formed which leads to an increase in accuracy of the sensor itself, as in the production of the sensor.

In a preferred embodiment, the accelerometer comprises a plastic and/or synthetic material that is suited for injection moulding. This allows to efficiently and cost-effectively produce, at least parts of, the accelerometer by means of injection moulding. Suitable plastics and/or synthetic materials are those that can easily be applied in an injection mould process, which, when cured, are stiff enough and exhibit low or substantially no creep. Examples are semi-aromatic polyamides, such as polyphthalamide (PPA) and/or poly acrylic acid (PAA), which are preferably modified with reinforcing agents such as glass fibres, tougheners and/or stabilizers. Other suitable materials are for instance liquid-crystal polymers (LCP), polyphenylene sulfide (PPS) and/or PEEK (polyetheretherketone) which are preferably also modified with reinforcing agents such as glass fibres, tougheners and/or stabilizers.

It is then preferred that the moving mass holder is made from the plastic and/or synthetic material and wherein the main moving mass comprises a second material with a higher volumetric density, such as the metals and/or glass mentioned earlier. Plastics and/or glass have the benefit that they are insensitive to magnetic and/or electrical fields, such that an optical accelerometer can be obtained that is insensitive to magnetic and/or electrical fields.

In a preferred embodiment, the accelerometer comprises two, preferably plastic and/or synthetic material, parts that are arranged to be assembled and the moving mass that is arranged to be fixedly coupled to, or into, the assembly of the two plastic and/or synthetic material parts, whereby preferably, the moving mass is arranged between the parts, as seen in the measurement direction, and wherein the moving mass is movable between the parts in only the measurement direction, whereby an optical fibre comprising a measurement section is arranged between the two parts and wherein the measurement section is arranged to measure the movement of the mass. Preferably the assembly of the two plastic and/or synthetic material parts comprises the frame, the transmission system, preferably at least one suspension system, and preferably the moving mass holder. A preferred embodiment of the accelerometer comprises two main parts, wherein in a first main part can comprise a first portion of a frame, a respective first flexure guide system(s) of one or more suspension systems, a first part of a moving mass (holder) and/or at least a part of the transmission system, and wherein a second main part can comprise a second portion of the frame, a respective second flexure guide system(s) of the one or more suspension systems, a second part of the moving mass (holder) and/or a remainder of the transmission system, wherein respective first and/or second main part is formed integrally, for instance by an injection moulding process. Hereby an accelerometer is obtained that can be made from a very low number of parts, thereby substantially reducing the complexity of assembly process and/or the associated costs of assembling the accelerometer.

In a preferred embodiment, the frame member, suspension system and transmission system are substantially formed from a first material, wherein the moving mass is formed from the first and a second material and wherein the second material has a higher volumetric mass density than the first material. Hereby, the moving mass can be kept relatively small, while at the same time enabling to tune the mass according to specifications of the specific accelerometer. For instance, an accelerometer designed for a low-frequency range can have substantially more mass arranged in the moving mass. The amount of first and/or second material can thereto be adapted accordingly.

The goal, amongst other goals, is also met by a method of manufacturing an accelerometer according to the invention, wherein production of the frame member, moving mass, suspension system and/or transmission system comprises the step of high precision machining. The accuracy of the sensor is determined for a large part by the accuracy with which is can be produced.

In a preferred embodiment, the method further comprising the step of providing a single piece of material and wherein the step of high precision machine comprises the removal of excess material from the single piece of material, preferably by means of electro discharge machining, for integrally forming a combination of at least two of the frame member, moving mass, suspensions system and transmission system. Electro discharge machine allows for high-precision removal of material, such that the accelerometer, or at least parts of it, can be integrally formed which leads to an increase in accuracy of the sensor itself, as also an increase in accuracy in the production of the sensor.

Additionally, or alternatively, the method preferably comprises a step of adding additional material and/or a second material by means of additive manufacturing, or 3D printing techniques. This allows for combining additional materials in the accelerometer, such that the accelerometer can more easily be customized to meet different specifications to suit a specific purpose. For instance, an accelerometer for the low-frequency range will tend to benefit from a moving mass that has more mass associated to it, whereas an accelerometer for the high-frequency range will tend to benefit from a decrease in the mass associated to the moving mass. Additional material, leading to an increase in mass, can be added by means of additive manufacturing, or 3D printing techniques.

The goal, amongst other goals, is also met by a method of manufacturing an accelerometer according to the invention, comprising the step of injection moulding a least a part of parts of the accelerometer, and preferably, further comprises the step of assembly of the injection moulded parts. Injection moulding is a production method that can economically produce high volumes of parts with the required production tolerances. Also, as has been discussed above, various suitable materials exist that have the required material properties.

In a further preferred embodiment, the method comprises the steps of:
  injection moulding a first and second plastic and/or synthetic material part;
  assembling the first and second plastic and/or synthetic material parts for forming at least a moving mass, a pivoting arm and a frame;

providing an optical fibre comprising a measurement section;

mounting the optical fibre to a fibre connection point of the pivoting arm and to frame, such the measurement section of the optical fibre is arranged in between the pivoting arm and the frame.

It is further preferred that the assembly of the first and second plastic and/or synthetic material parts further comprise a moving mass holder, wherein the method further comprises the steps of:

providing a main moving mass, wherein the main moving mass is made from a material with a higher volumetric density;

fixedly mounting the main moving mass in the moving mass holder.

As discussed earlier, such an accelerometer comprises two main parts, wherein in a first main part can comprise a first portion of a frame, a respective first flexure guide system(s) of one or more suspension systems, a first part of a moving mass (holder) and/or at least a part of the transmission system, and wherein a second main part can comprise a second portion of the frame, a respective second flexure guide system(s) of the one or more suspension systems, a second part of the moving mass (holder) and/or a remainder of the transmission system, wherein respective first and/or second main part is formed integrally by injection moulding. Hereby an accelerometer is obtained that can be made from a very low number of parts, thereby substantially reducing the complexity of assembly process and/or the associated costs of assembly.

The present invention is further illustrated by the following figures, which show preferred embodiments of the accelerometer according to the invention, and are not intended to limit the scope of the invention in any way, wherein:

FIG. 1 schematically shows an optical accelerometer according to the prior art.

FIG. 2 schematically shows an embodiment of an accelerometer according to the invention.

Figure 1:
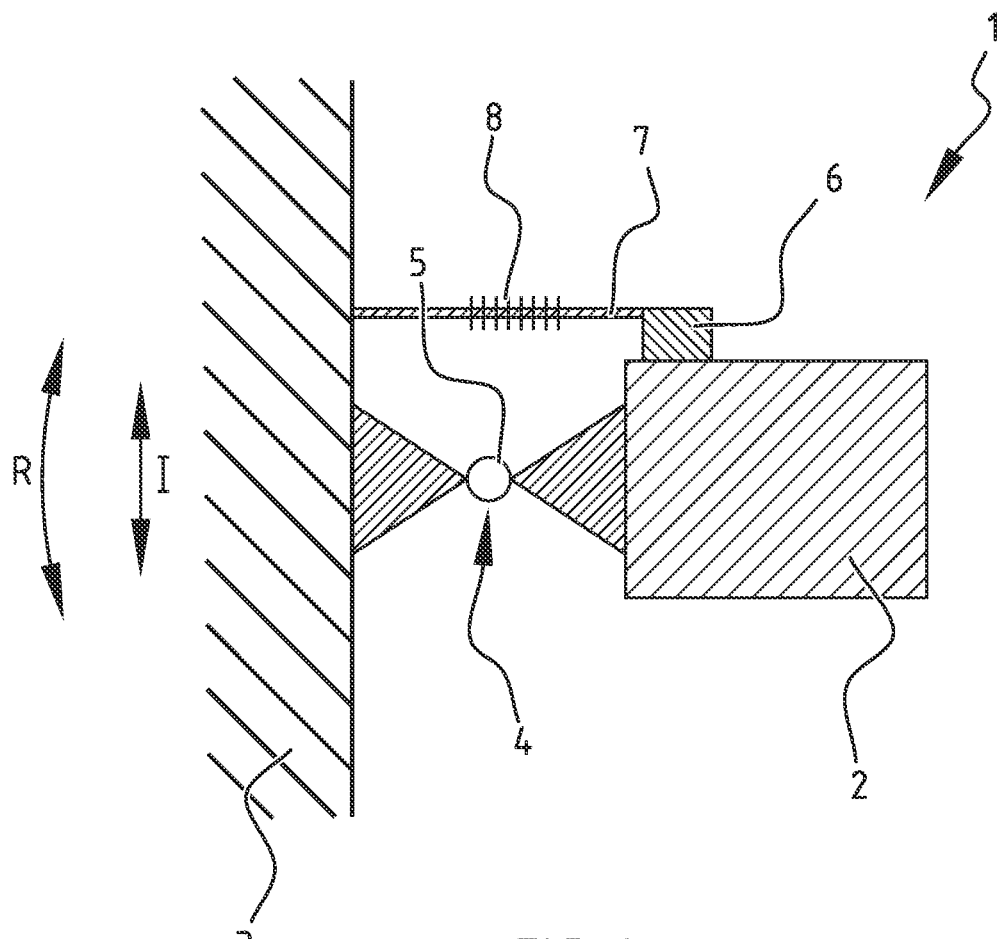

FIG. 1 shows an optical accelerometer 1 according to the prior art, wherein a movable mass 2 is rotatable mounted to a frame 3, or reference part, of the accelerometer 1. The movable mass 2 is mounted through hinge 4, which is arranged to pivot around pivot axis 5. The mass 2 is connected, through a lever arm 6, to the optical fibre 7 that comprises a measurement section 8. Upon movement of the movable mass 2, a strain variation is imposed on optical fibre 7, whereby measurement section 8 is arranged to measure the imposed strain variation.

Even though the accelerometer 1 is arranged to measure accelerations in the measurement direction I, it will, due to the construction, also measure imposed accelerations in rotational direction R. Hereby, the accelerometer 1 suffers from significant cross-talk, also referred to as cross-axis sensitivity. Rotational acceleration in rotational direction R thus influences the output signal the accelerometer 1 gives, such that reliable measurements cannot be guaranteed. In addition, as not only the mass of the movable mass 2, but also the rotational inertia of the movable mass 2 plays a role in the response to accelerations in the measurement direction I, the accelerometer 1 is hard to calibrate and tends to show a nonlinear relationship between the amplitude of the accelerations and the strain imposed on the fibre 7, such that is hard to get accurate measurement with this accelerometer 1.

Figure 2:
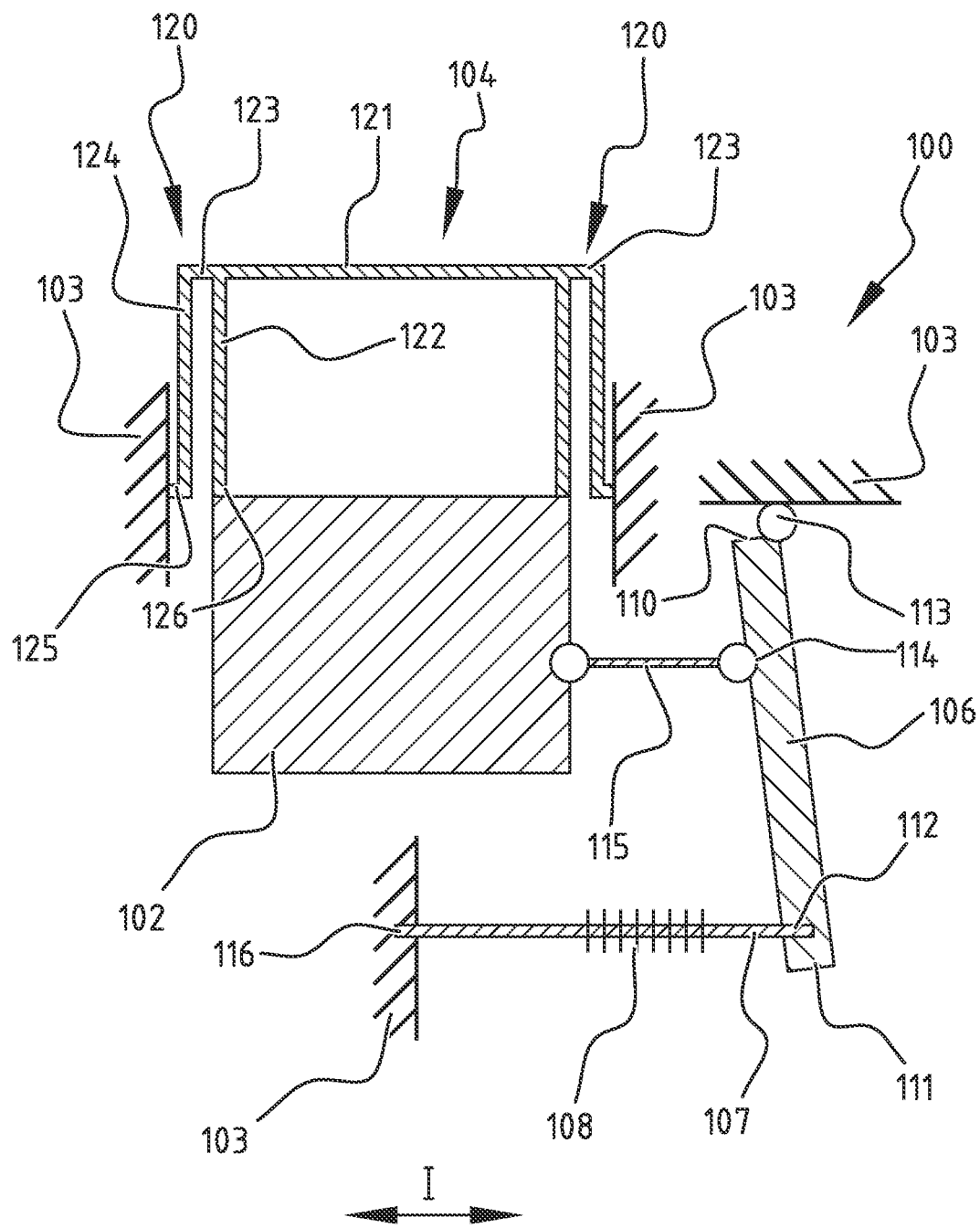

FIG. 2 shows a schematic view of an accelerometer 100 according to the invention. The accelerometer 100 is again fitted with a moving, or movable, mass 102, which is connected, through a suspension system 104 to a frame 103, or reference part, of the accelerometer 100. The movable mass 102 is also pivotally coupled to a pivoting arm 106, which is pivotally connected on first end 110 to the frame 103, and is connected to the optical fibre 107 at the fibre connection point 112, which in this example is located near the second end 111. Arranged in between the pivotal connection 113 on, or near, the first end 110 and the fibre connection point 112 is a pivotal connection 114 with a connector, or push-rod, 115 that pivotally connects to the movable mass 102.

The optical fibre 107, comprising measurement section 108 that typically takes the form of a Fibre-Bragg Grating (FBG), is arranged between the fibre connection point 112 and a section 116 of the frame 103. A pivoting motion of the pivoting arm 106 results in a movement of the fibre connection, or coupling, point 112 in substantially only a direction that is parallel to the measurement direction I. Thereby, the optical fibre 107, that is arranged to be substantially parallel to the measurement direction I, experiences a change in strain, which can be measured by measurement section 108. In order to be able to measure both an elongation and a contraction of the optical fibre 107, the optical fibre 107 is typically mounted with a certain pre-loaded tension, such that, at rest, the optical fibre 107 is already elongated. Thereby, a certain initial (positive) tensile strain is introduced in the optical fibre 107. A motion of the fibre connection point 112 towards the section 116, will results in a decrease of the strain induced in the optical fibre 107. The pre-loaded tension will typically be chosen such that, when in use under normal circumstances, the strain in the optical fibre 107 will not become zero (or negative).

The suspension system 104 is arranged such that the moving mass 102 can move substantially only in a direction parallel to the measurement direction I. For this purpose, the suspension system 104 comprises flexure guide systems 120 that are arranged substantially parallel to each other, spaced at a certain distance d1, on the moving mass 102. Each flexure guide system 120 comprises two substantially equal leaf spring elements 122, 124 that are arranged in a U-shape, whereby the leaf springs 122, 124 form the legs of the U-shape. The U-bottoms 123 of the U-shapes have a substantially higher bending stiffness, when compared to the leaf spring elements 122, 124. To further stabilize the suspension system 104, the U-bottoms 123 are connected to each other through a stiff connecting element 121, whereby the U-bottoms 123 can also be comprised in the connecting element 121.

A free end of the first leg 125, which is formed by leaf spring element 124, of the U-shape is connected to the frame 103 of the accelerometer 100, whereas a free end of the second leg 126, which is formed by leaf spring element 122, of the U-shape is connected to the moving mass 102. The leaf springs 122, 124, which are arranged to only bend in a direction substantially parallel to the measurement direction I, thereby ensure that the moving mass 102 can substantially only move in a direction parallel to the measurement direction I.

As a result of accelerations imposed in the measurement direction I, the moving mass 102 will move relative to the frame 103 in a direction parallel to the measurement direction I. The moving mass 102 transfers this motion, through the connector 115, to the pivoting arm 106. The pivoting arm 106, thereby pivots around pivot point 113 resulting in a motion of the fibre connection point 112 in a direction substantially parallel to the measurement direction I, thereby resulting in a change of strain in the optical fibre 107. The measurement section 108 thus also deforms, whereby the properties of the grating of the FBG also change, which leads to a shift in the wavelengths that are reflected and/or allowed to pass. This change in wavelength is then converted to a measured acceleration by means of a suitable interpreter.

If accelerations in directions other than the measurement direction I are imposed, the movable mass 102 will, due to the construction of the suspension 104 and transmission system 127, not be allowed to move relative to the frame. Thereby, the pivoting arm 106 will not be urged by the moving mass 102, such that the fibre connection point 112 remains substantially stationary and no change in strain is induced in the optical fibre 107. Hence, the accelerometer 100 that is schematically shown in FIG. 1 has very low cross-axis sensitivity.

Figure 3:
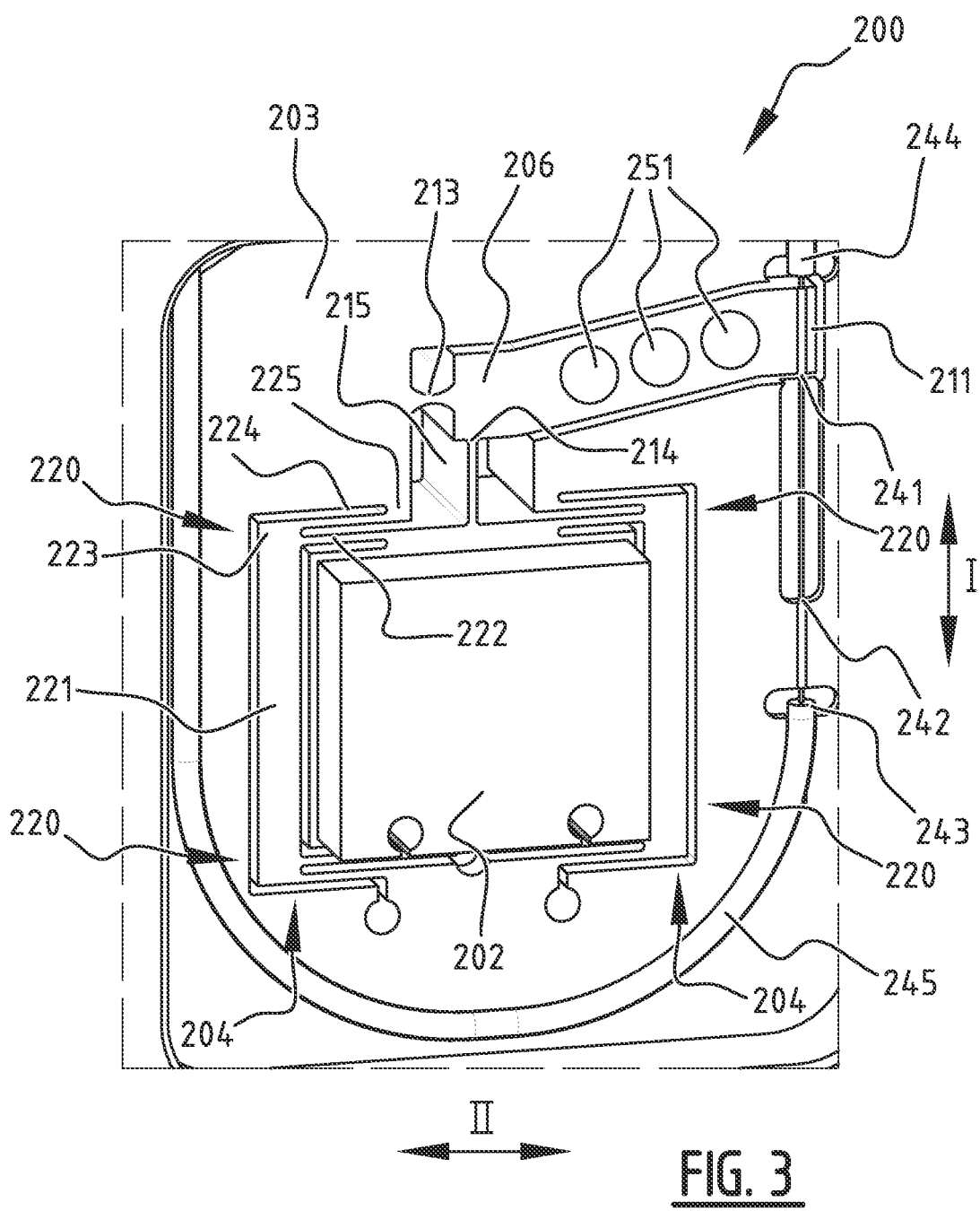
FIG. 3 is a 3D perspective view of a second embodiment of an accelerometer according to the invention.
Figure 4:
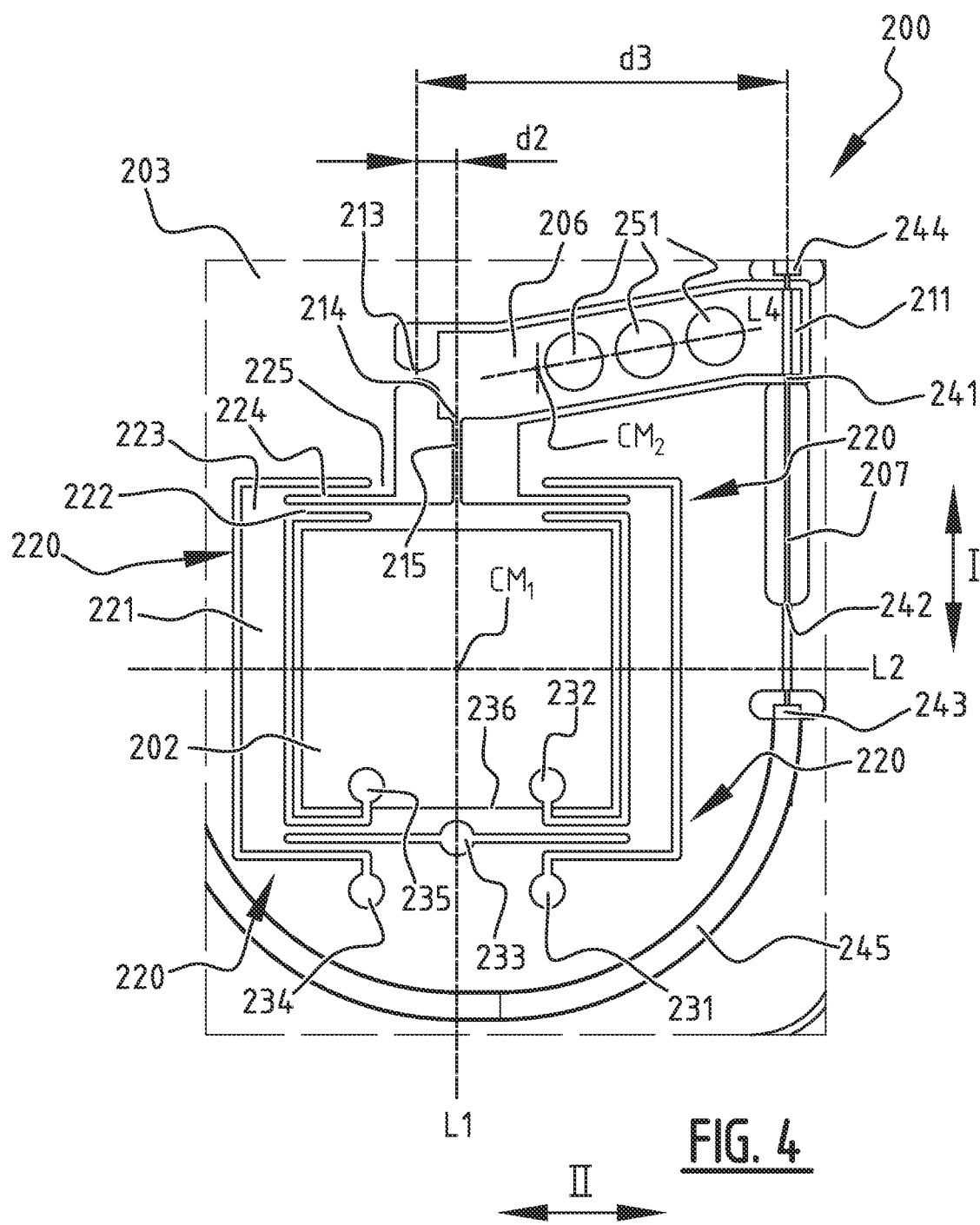
FIG. 4 shows a front view of the second embodiment.

FIGS. 3 and 4 respectively show a 3D perspective view and a front view of a second embodiment of the accelerometer. Centrally located in the accelerometer 200 is the moving mass 202, which is suspended by means of two suspension systems 204 in the frame 203 such that it can substantially only move in a direction parallel to the measurement direction I. The suspension systems 204, which are formed integral with the moving mass 202 and the frame 203, each comprise two flexure guide systems 220, which are connected by means of the connecting element 221. The flexure guide systems 220 are constructed similarly as the flexure guide systems 120, as shown in FIG. 2. Hence, two leaf spring elements 222, 224 that have substantially the same properties, form the legs of the U-shaped flexure guide system 220, whereas the bottoms 223 of the U-shapes, which are integrally formed with the connecting element 221, have a substantially higher bending stiffness, when compared to the leaf spring elements 222, 224.

Similar as in the accelerometer 100 that is shown in FIG. 1, a free end of the first leg 225, which is formed by leaf spring element 224, of the U-shape is connected to the frame 203 of the accelerometer 200, whereas a free end of the second leg 226, which is formed by leaf spring element 222, of the U-shape is connected to the moving mass 202. The leaf springs 222, 224, which are arranged to only bend in a direction substantially parallel to the measurement direction I, thereby enable that the moving mass 202 can substantially only move in a direction parallel to the measurement direction I. The suspension systems 204 are arranged on opposite sides of the moving mass 202 such that they are substantially symmetric around symmetry line L1 that runs parallel to the measurement direction I. Furthermore, the moving mass 202 and suspension systems 204 are also substantially symmetric around line L2 that runs perpendicular to the measurement direction. Hereby, the moving mass 203 is held stiff and firmly in all directions other than the measurement direction I. Several holes 231, 232, 233, 234, 235 can be identified in the frame 203 and the movable mass 202, on, or near, one side 236 of the movable mass. Even though these holes 231, 232, 233, 234, 235 break the perfect symmetry around line L2, they do not serve a structural purpose, but arise from the production process, as will be discussed later.

The moving mass 202 is coupled to the pivoting arm 206 at a mass coupling point 214. This coupling is done through a connector 215, which functions as a push-rod and an flexible hinge, such that the pivoting motion for which the pivoting arm 206 arranged, is not hindered by the connection to the moving mass 202. As the moving mass 202 pushes the pivoting arm 206 through the connector 215, the slight relative rotation between the moving mass 202 and the pivoting arm 215 is taken up by a slight bending of the connector 215. The pivoting arm is pivotally connected on a first end 210 by means of a flexible hinge 213 to the frame 203, thereby allowing the pivoting arm to pivot. On, or near, a second end 211 of the pivoting arm 206, an optical fibre 207 is connected to the pivoting arm 206 at the fibre connection point 212. The pivoting arm 206 functions as a lever, wherein the ratio of the distance between the fibre connection point 212 and the flexible hinge 213, which is denoted by d3, and the distance between the mass coupling point 214 and the flexible hinge 213, which is donated by d2, determine the leverage of the pivot arm 206. The leverage thus determines the amount with which a movement of the moving mass 202 in the measurement direction I is multiplied to a movement of the fibre connection point 212 that is parallel to the measurement direction I.

The optical fibre 207 is fixed on, or near, a first end of the measurement section 241 to the fibre connection point 212 and on, or near, a second, opposing end of the measurement section 242 to the frame 203. As the optical fibre 207 is arranged substantially parallel to the measurement direction I, a movement of the fibre connection point 212 that is parallel to the measurement direction I, results in a change the induced strain in the optical fibre 207, that can be measured in the measurement section (not shown) that is arranged in between the first and second ends 241, 242 of the optical fibre 207. As in the accelerometer 100 shown in FIG. 2, the optical fibre 207 is typically mounted with a certain pre-loaded tension, such that, at rest, the optical fibre 207 is already elongated. Also, the measurement section typically takes the form, or comprises at least, an FBG. The remainder of the optical fibre 243, 244 that is arranged in a part of the accelerometer 200 that is not between the first and second ends 241, 242 is guided in optical fibre guiding means 245. As a part of the optical fibre 243 is arranged in a J-lay, or a J-shaped arrangement, this part is substantially stress free, such that any disturbances introduced at in- and outlet sections that are arranged for coupling to external optical wiring, are mostly isolated from the measurement section arranged on the optical fibre 207.

The pivoting arm 206 contains holes, or extrusions, 251. These holes are arranged near the neutral bending line L4 of the pivoting arm, such that they have a negligible effect on the bending stiffness of the pivoting arm 206, while at the same time reducing the mass of the pivoting arm 206. Hereby, the inertia forces, due to imposed accelerations, working directly on the pivoting arm 206 are reduced and the cross-sensitivity is thereby even further minimized.

The mass in the moving mass 202 is preferably distributed such that a virtual line drawn from the centre of gravity CM1 of the moving mass 202 to the mass coupling point 214, which overlaps in the current embodiment with symmetry line L1, is substantially parallel to the measurement direction I. Also, a virtual line, which overlaps in the current embodiment with symmetry line L4, drawn from the centre of gravity CM2 of the pivoting arm 206 to the flexible hinge 214 is almost, or preferably substantially, parallel to direction II, which is substantially perpendicular to measurement direction I. Hereby, any inertia forces, as a result of accelerations in the direction II, generate only a small, or preferably negligible, torque around the flexible hinge 214. This small, or negligible, torque results in substantially no, or negligible, pivoting of the arm 206, such that a negligible strain variation is induced on the measurement section of the optical fibre 207, thereby contributing in obtaining the accelerometer 200 with a very low cross-axis sensitivity.

Figure 5A:
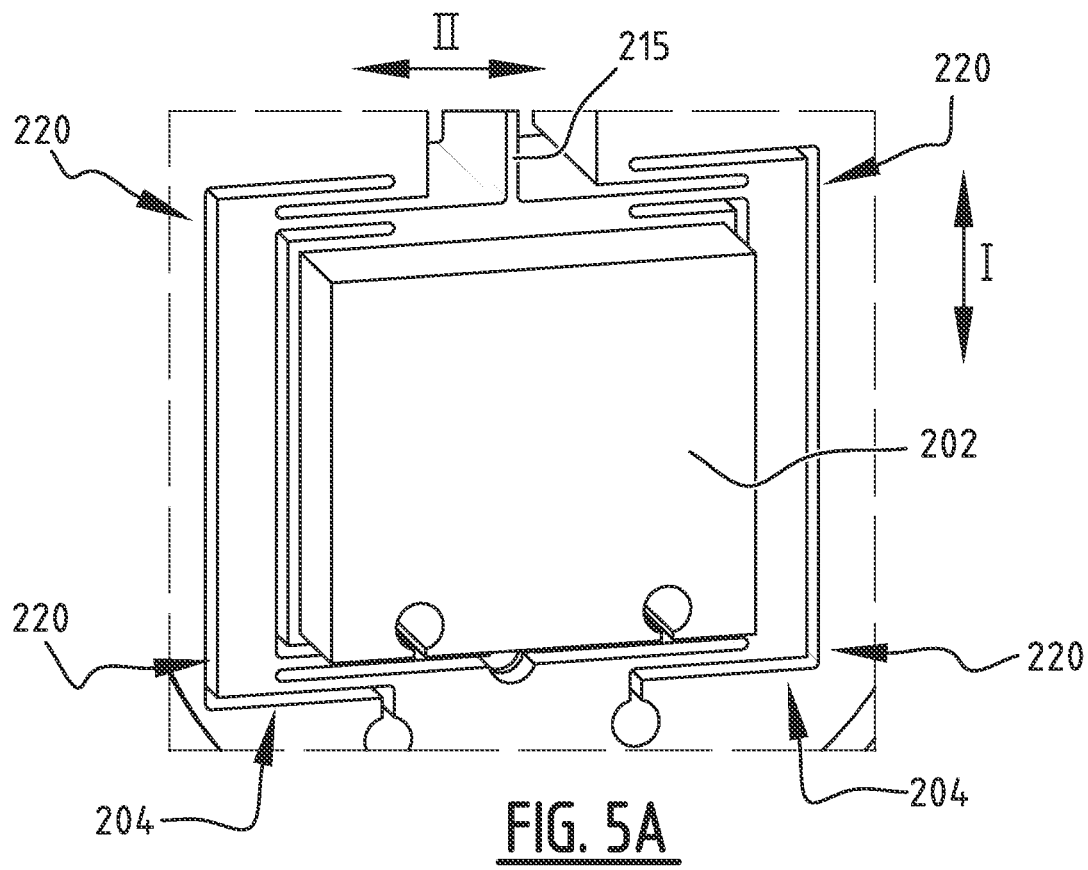
FIG. 5A is a 3D perspective view that is zoomed in on the moving mass suspended in the accelerometer according to the second embodiment.
Figure 5B:
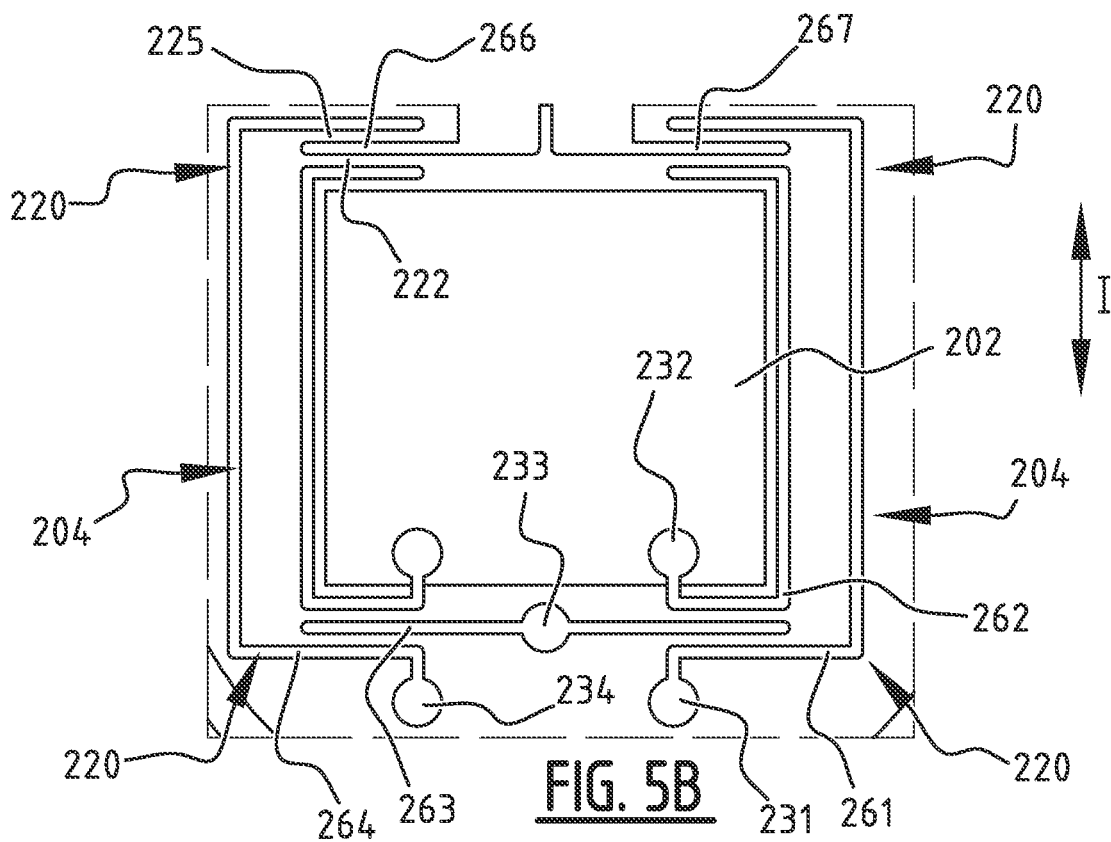
FIG. 5B is a front view that is zoomed in on the moving mass suspended in the accelerometer according to the second embodiment.

Details of the moving mass 202 and the suspension systems 204 that suspend the moving mass 202 in the frame 203 in such a manner that the moving mass 202 is only allowed to move in a direction parallel to the measurement direction I are shown in FIGS. 5A and 5B. From these figures, and especially from FIG. 5A, it is clear that the frame 203, suspension systems 204, moving mass 202 and the connector 215 are all formed from a single piece of material. In production a single piece of material which already has the major contours of the accelerometer is taken as a starting point.

This can be achieved by, for instance, casting the material, preferably of a metal, into a shape comprising the major contours of the accelerometer or by means of milling away material from a single block, and/or a combination of both. After this step, the minor details of the design are cut from the piece of material. The moving mass 202, which may protrude outwardly, as is seen in FIG. 5A, can also be made thinner, thereby protruding less and having less mass. Hereby, the mass of the moving mass 202 can be tuned to the specifications. Alternatively, or additionally, an additional layer of a second material, that preferably has a higher volumetric density, can be added, for instance by a 3D printing process, to the moving mass 202. Hereby, the mass of the moving mass 202 can be effectively and efficiently increased.

The minor details, such as the extrusions, or slits, 261, 262, 263, 264, 265, 266, 267 may be cut/created in a second production step. For enabling a smooth, single directional, movement of the moving mass, it is important that all the leaf spring elements 222, 225 that are comprised in the flexure guide systems 220 are substantially equal of shape, and thereby in terms of mechanical properties, such as the bending stiffness. A method for creating these features with high precision is by means of Electro Discharge Machining (EDM). EDM, which is also known as spark machining, spark eroding, burning, die sinking, wire burning or wire erosion, is a manufacturing process whereby a desired shape is obtained by using electrical discharges (sparks). With EDM, material is removed from a work piece, i.e. the block of material eventually forming the accelerometer, by a series of rapidly recurring current discharges between two electrodes that are separated by a dielectric fluid and subjected to an electric voltage. One of the electrodes is the tool-electrode, while the other is called the workpiece-electrode, i.e. the block of material eventually forming the accelerometer. The process depends upon the tool and work piece not making actual contact. The extrusions, or slits, 261, 262, 263, 264, 265, 266, 267, are thus created by means of EDM, whereby the tool-electrode is initially inserted through holes 231, 232, 233, 234, 235 and then moves through the piece of material, thereby forming the extrusions 261, 262, 263, 264, 265, 266, 267.

In FIG. 5A it can also be seen that, for instance, the leaf spring elements 222, 224, the connector 215, but also all other components making up the suspension systems 204, have relatively large dimensions in a third, out-of-plane direction that is substantially perpendicular to first and second in-plane directions I, II, whereby in-plane direction I corresponds to the measurement direction I. By focusing, for instance, on connector 215, it is seen that the dimension in the second in-plane direction II is much smaller than the dimensions in the first in-plane direction I and the out-of-plane direction. Hereby, the connector 215 is arranged such that it is substantially only allowed to bend in the second in-plane direction II, but not in the out-of-plane direction and the first in-plane direction I, hence the mass 202 and pivoting arm 206 (see FIGS. 3 and 4) are only allowed to pivot with respect to each other around a pivot axis of the connector 215 that runs substantially parallel to the out-of-plane direction. This, preferably, also holds for the flexible elements of the suspension systems 204, such as the leaf springs 222, 224, thereby the moving mass 202 is also restrained in the out-of-plane direction, such that it can substantially only move in the direction of the measurement direction I.

Figure 6A:
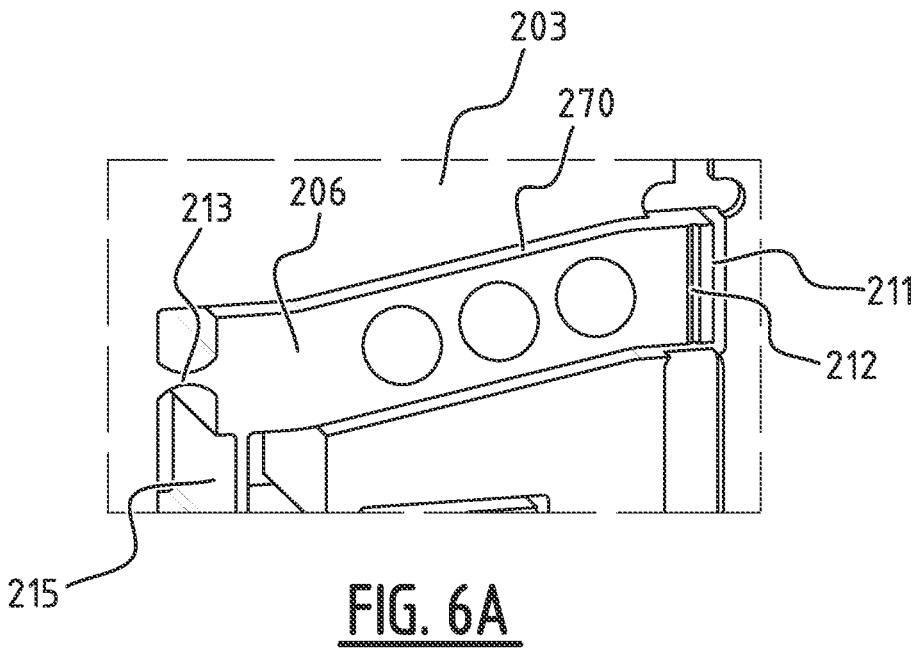
FIG. 6A is a 3D perspective view that is zoomed in on the transmission system of the accelerometer according to the second embodiment.
Figure 6B:
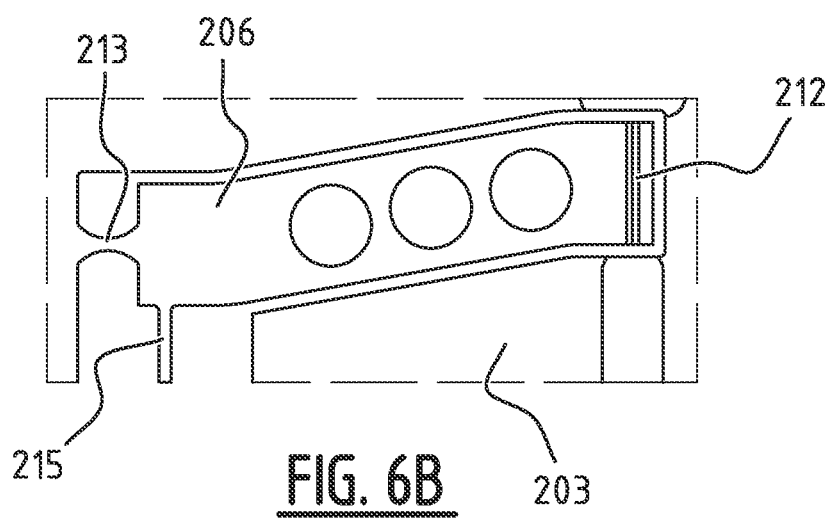
FIG. 6B is a front view that is zoomed in on the transmission system of the accelerometer according to the second embodiment.

In FIGS. 6A and 6B the pivoting arm 206 and its connections and connections points are shown in more detail. Also here, it is seen that, for the flexible hinge 213, the dimension in the second in-plane direction II is much smaller than the dimensions in the first in-plane direction I and the out-of-plane direction. Thereby, the construction of the flexible hinge 213 also substantially only allows for the pivoting arm 206 to pivot with respect to the frame 203 around a pivot axis of the flexible hinge 213 that runs substantially parallel to the out-of-plane direction. It is furthermore shown that the pivoting arm 206 is formed from the same piece of material as the frame 203 by forming, preferably by EDM, an extrusion, or slit 270, around the contour of the pivoting arm 206. Pivoting arm 206 further comprises holes 251, which have been discussed earlier, and the fibre connection point 212, where the optical fibre 207 (not shown in FIGS. 6A and 6B) is connected to the pivoting arm 206 by means of glue, or any other suited method for connecting.

Figure 7:
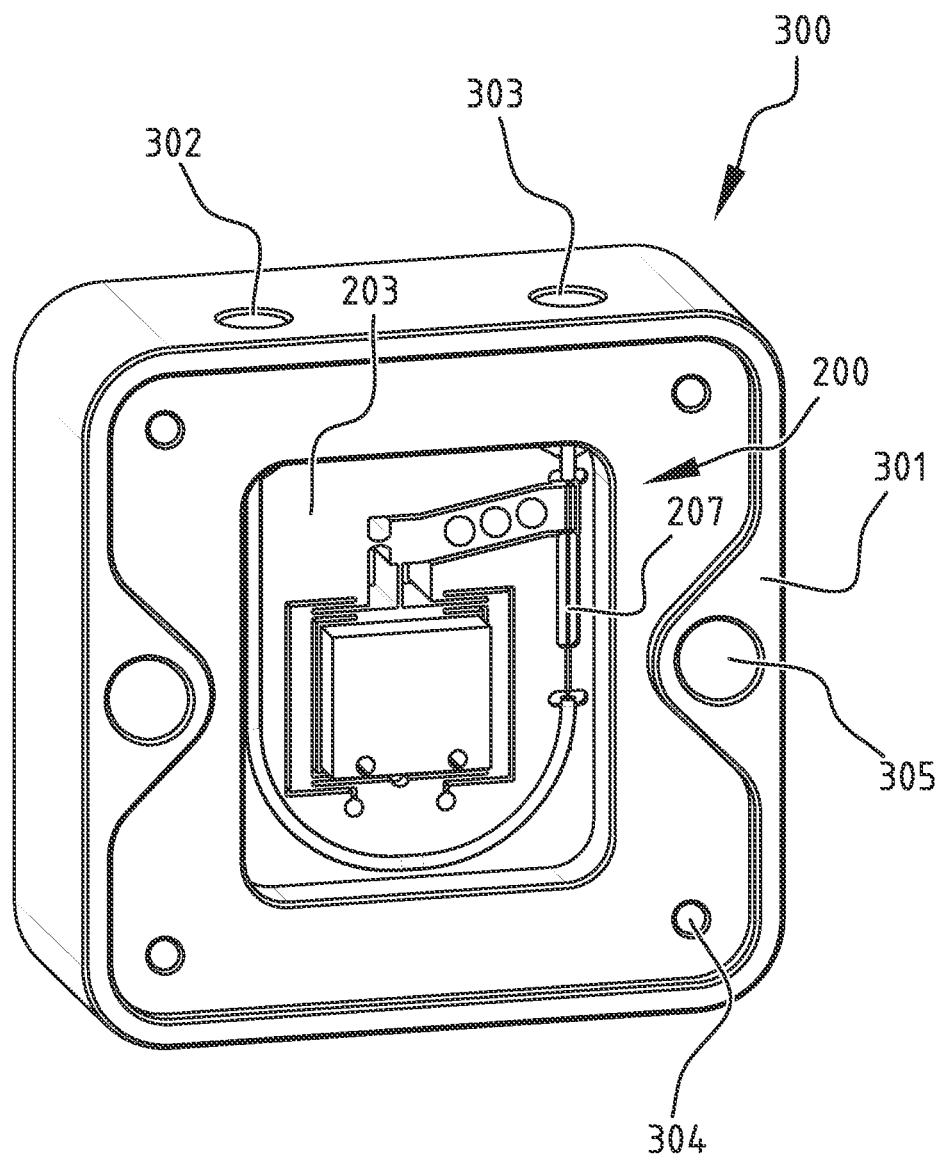
FIG. 7 is a 3D perspective view of an accelerometer according the second embodiment.

FIG. 7 shows an accelerometer with a housing 300, which is basically the accelerometer 200 comprised in a housing 301, for shielding the internal components of accelerometer 200. Housing 301 can be integrally formed with frame 203, and can thereby also be formed integrally, from for instance a single block of material, with at least a part of the parts, apart from the optical fibre 207, of accelerometer 200. In this case, the accelerometer, apart from the optical fibre 207, is preferably made from a single piece of metal, where the different features are formed by means of high-precision milling, EDM, or similar types of highly accurate machining methods. The housing 301 can also be a separate part that is assembled around accelerometer 200, such that the housing 301 and the accelerometer 200 can be made from different materials. Housing 301 can for instance be casted or injection moulded from a suitable plastic, whereas the accelerometer 200 is primarily made from a metal.

Housing 301 further comprises in- and/or outlet openings 302, 303, that allow for connecting external optical wiring to the accelerometer 200. Furthermore, the housing 301 can be fitted with (screw) holes 304 for screwing a cover plate (not shown) on the housing 301, for fully shielding the accelerometer 200. Also, through-holes 305 can be arranged, which allow for screwing or otherwise mounting of the accelerometer with housing 300 to a test-object (not shown).

Figure 8:
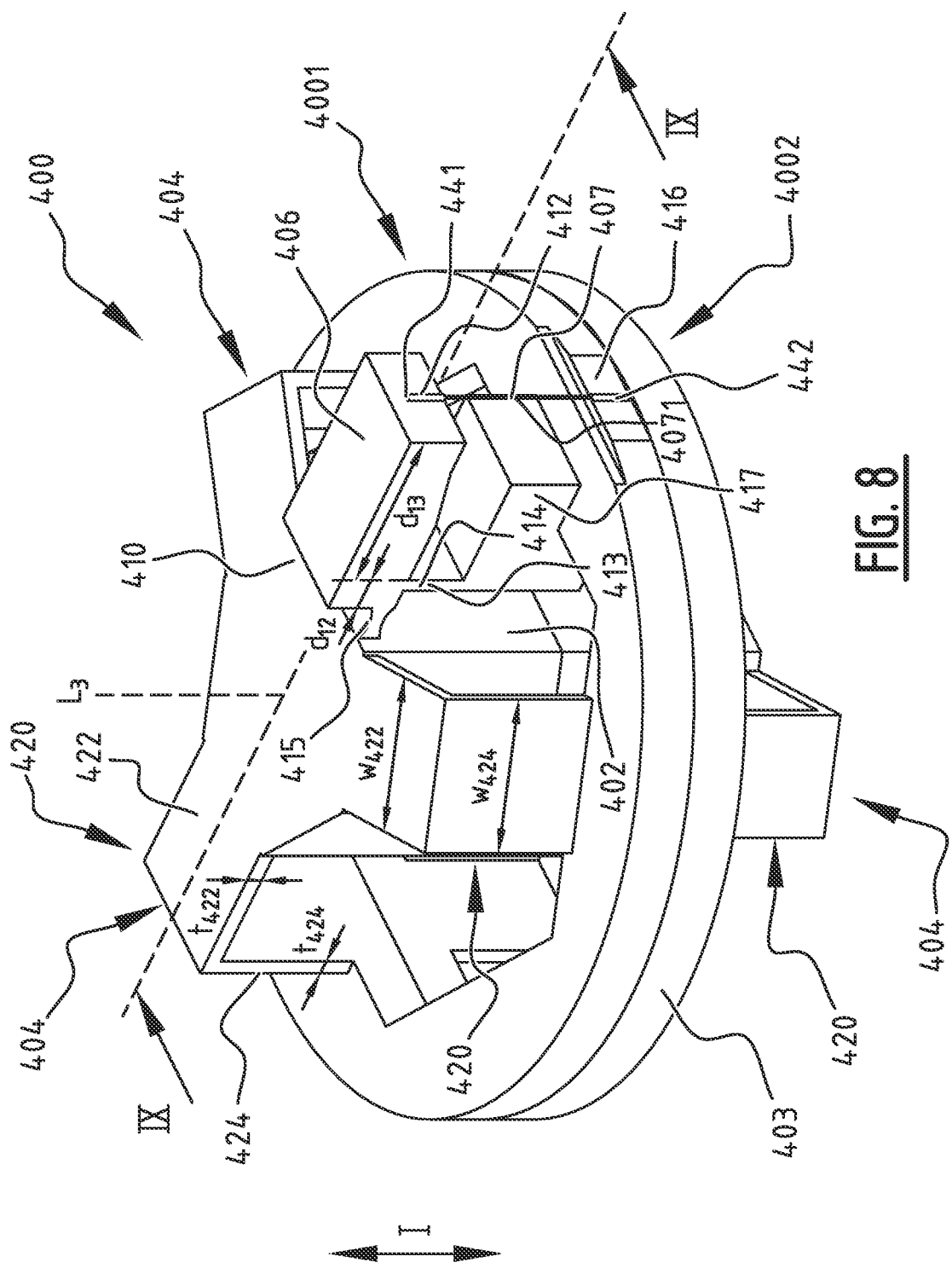
FIG. 8 is a 3D perspective view of an accelerometer according to a third embodiment.
Figure 9:
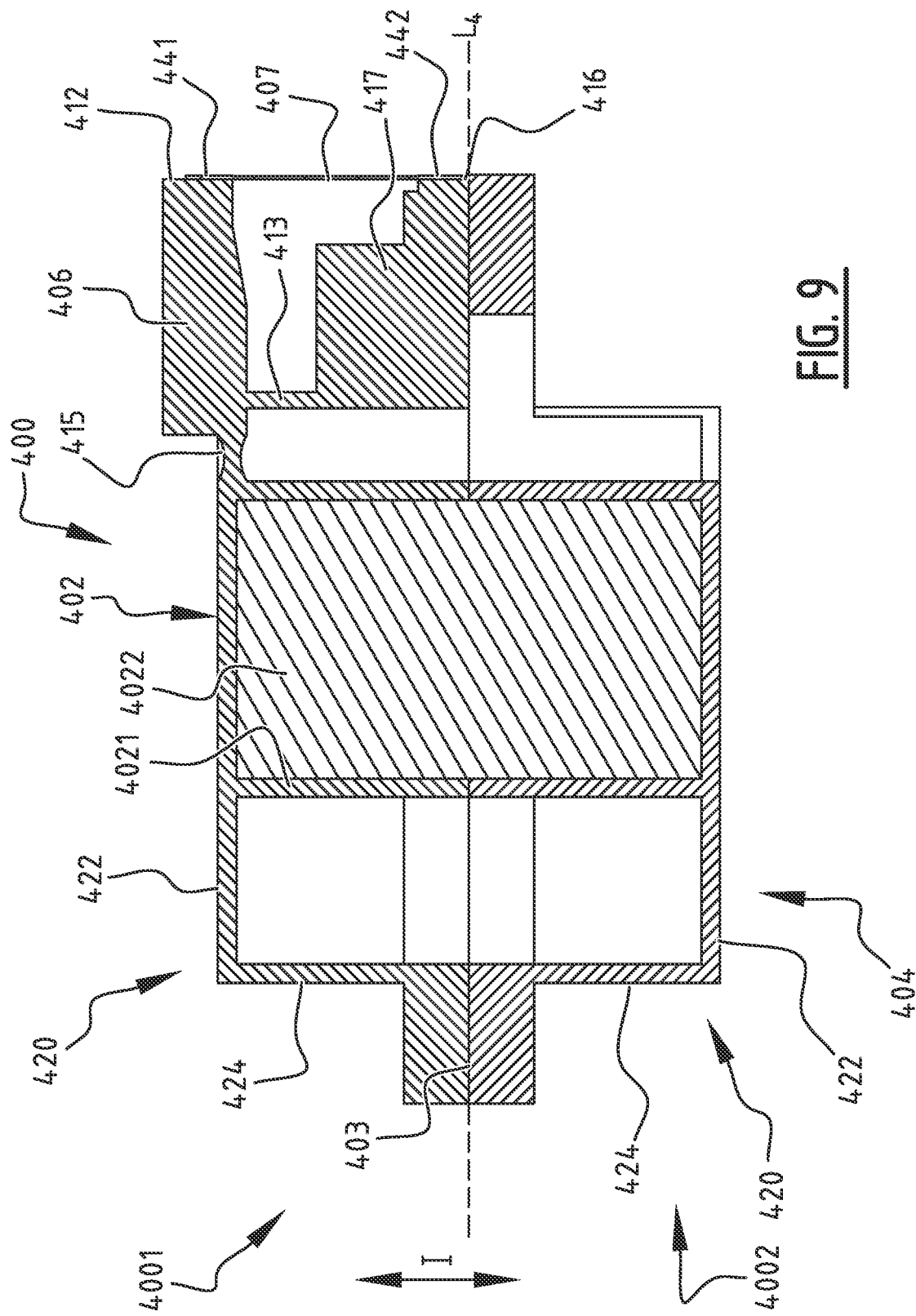
FIG. 9 is a cross-sectional view of the accelerometer according to the third embodiment.

FIGS. 8 and 9 show a third embodiment of the accelerometer. Accelerometer 400 again comprises a moving mass 402 that is arranged to be movable in the measurement direction I and a frame member 403, and further also comprises a suspension system, in this example three suspension systems 404. Each of the suspension systems 404 can comprise two flexure guide systems 420 that are arranged on, or near, opposite sides of the moving mass 402, when seen in the measurement direction I. The flexure guide systems 420 are arranged between the moving mass 402 on one side of the flexure guide system 420 and the frame member 403 on another side of the flexure guide system 420. Flexure guide systems 420 can comprise a first leaf spring element 422 and a second leaf spring element 424, wherein the leaf spring elements 422, 424 are arranged under an angle, in particular at a substantially right angle, with respect to each other, such that they are substantially perpendicular with respect to each other. The first leaf spring elements 422 are thus arranged to bend in a direction substantially parallel to the measurement direction I, whereas the second leaf spring elements 424 are arranged to bend towards and away from the moving mass 402 in a direction that is substantially orthogonal to the measurement direction I.

The three suspension systems 404 are substantially equally divided around a central axis L3 that runs substantially parallel to the measurement direction I through a centre of the moving mass 402. First and second leaf spring elements 422, 424 respectively have a certain thickness t422, t424 and a certain width w422, w424, wherein the respective thicknesses t422, t424 can be substantially equal and wherein the respective widths w422, w424 can be substantially equal. As the widths are significantly greater than the respective thicknesses of the leaf spring elements 422, 424, the leaf spring elements 422, 424 can substantially only bend around a respective bending axis. Hence, a second leaf spring 424 can only bend inwards or outwards in a direction from or towards the central axis L3. This arrangement of at least three suspension systems 404 that are arranged in between the moving mass 402 and the frame 403 thus prevent the moving mass 402 from moving in a direction perpendicular from the measurement direction I, as in any such direction at least four of the six second leaf spring elements 424 that are arranged around the moving mass 402 are required to bend in a direction that is not in line with their bending axis, as is described above. This ensures that the moving mass 402 can substantially only move in a direction that is substantially parallel to the measurement direction I, as the mutually cooperating suspension systems 404 only allow for a bending in the direction substantially parallel to the measurement direction I.

Furthermore, due to the number of suspension systems 404 applied, the moving mass 402 is an overdetermined system. The arrangement of the flexure guide systems 420, in particular the arrangement and flexibility of the first and second leaf spring elements 422, 424, allows for effectively absorbing, through a bending of the first and second leaf springs elements 422, 424, the effects of the over-determination of the moving mass 402. Especially the second leaf springs 424 are arranged for taking up any deformations relating to the over-determination of the system, or any thermal expansion effects of the material of the accelerometer. In addition, second leaf springs 424 can, by bending, also allow for any non-linear geometric bending effects of the first leaf springs 422. Hereby, a reliable suspension of the moving mass 402 is obtained.

Similar to the previous embodiments, a transmission system is arranged for transferring the movement of the movable mass 402 to a measurement section 4071 of optical fibre 407. The transmission system comprises pivoting arm 406, that is arranged between the moving mass 402 and the optical fibre 407. The pivoting arm 406 is connected to moving mass 402 at, or near, a first end 410 of the pivoting arm 406 by means of a flexible hinge 415. The optical fibre 407 is coupled to the pivoting arm 406 on, or near, a second end 411 at a fibre coupling point 412. By providing a hinging point 414 which is provided at a distance d12 from the first end 410 and a distance d13 from the fibre coupling point, in particular by providing the hinging point 414 in between the first and second ends 410, 411, the pivoting arm 406 acts as a lever. Note that it is preferred that the ends 410, 411 of the pivoting arm 406 move substantially only in the measurement direction I. As is described earlier, inertial forces in directions other than the measurement direction I hereby have a minimal influence on moving parts of the transmission system and thereby lead to a very low cross-axis sensitivity of the accelerometer 400.

The leverage of the pivoting arm 406 is dependent on the ratio between the distances d12, d13. Preferably, the leverage of the pivoting arm 406 is greater than 1, preferably greater than 3, more preferably greater than 5. A stiffening section 417 can be arranged on the frame member 403 at the location of the pivoting arm 406, wherein the stiffening section 417 and the pivoting arm 406 are connected by means of a leaf spring hinge 413, wherein the leaf spring hinge 413 is allowed to bend inwardly, in a direction towards the central axis L3 and/or outwardly in a direction away from the central axis L3.

The optical fibre 407 comprises a measurement section 4071 and the optical fibre 407 is arranged such that a first end 441 of the part of the optical fibre comprising the measurement section 4071 is connected to the fibre coupling point 412 of the pivoting arm 406 and that a second end 442 of the part of the optical fibre comprising the measurement section 4071 is connected to a fibre frame section 416. Thereby, the measurement section 4071 is arranged in between the fibre coupling point 412 that is arranged to move with the moving mass 402, and the fibre frame section 416 that is arranged to be stationary with respect to the frame 403. Thereby, a movement of the moving mass 402 in the measurement direction I results in a movement of the fibre coupling point 412, whereby a strain variation is induced in the measurement section that can be measured. A Fibre-Bragg Grating (FBG) is an example of a measurement section 4071 that can measure strain in the optical fibre 407.

The accelerometer 400 can comprise two assembly parts, wherein the first assembly part 4001 comprises a first part of the frame 403, a first part of the moving mass 402, and three (upper) flexure guide systems 420 of the respectively three suspension systems 404. The second assembly part 4002 can comprise a second part of the frame 403 a second part of the moving mass 402, and three (lower) flexure guide systems 420 of the respectively three suspension systems 404. In the assembled state of the two assembly parts 4001, 4002 the three flexure guide systems 420 of the first assembly part 4001 and the three flexure guide systems 420 of the second assembly part 4002 form the three suspension systems 404. First or second assembly part 4001, 4002 can comprise the transmission system, comprising the pivoting arm 406. First and second assembly parts 4001, 4002 can also be identical, wherein, in the assembled state, the parts 4001, 4002 are rotated substantially 180 degree with respect to each other in the plane that is substantially orthogonal to the measurement direction I and are rotated substantially 180 degree around the central axis L3 with respect to each other. Hereby, the accelerometer is composed from an optical fibre 407 and two identical parts 4001, 4002, wherein possibly the moving mass 402 comprises a separate additional main moving mass 4022. Hereby an accelerometer 400 is obtained that is easily produced with substantially a minimum of parts, in addition only a single type of mould is required for the forming the assembly parts 4001, 4002.

FIG. 9 shows the cross-section of the accelerometer 400, according to the FIG. 8, along line IX. In addition to the features shown in FIG. 8 and discussed above, the additional main moving mass 4022 is shown. The main moving mass 4022 is enclosed by a main mass holder 4021 that is formed from assembling the assembly parts 4001, 4002. The main moving mass 4022 can be made from a material that is different from the material of the assembly parts 4001, 4002. Suitable materials for forming the assembly parts 4001, 4002 are plastics and/or materials suited for injection moulding. Highly suitable are for instance semi-aromatic polyamides, such as polyphthalamide (PPA) and/or poly acrylic acid (PAA), which are preferably modified with reinforcing agents such as glass fibres, tougheners and/or stabilizers. Other suitable materials are for instance liquid-crystal polymers (LCP), polyphenylene sulfide (PPS) and/or PEEK (polyetheretherketone) which are preferably also modified with reinforcing agents such as glass fibres, tougheners and/or stabilizers. Suitable methods for connecting the assembly parts 4001, 4002 in the assembled state, such as welding (e.g. ultrasonic welding), gluing or the like, can be used. Additionally, or alternatively, snap-fit type connectors and/or other means of force-closed and/or form-closed connection mechanisms can be applied.

The main moving mass 4022 can be made from the same material as the assembly parts 4001, 4002. It is however preferred the main moving mass 4022 comprises a second material with a higher volumetric density, such as a metal, for instance steel, tungsten, brass, etc, and/or non-metallic materials, for instance glass. Plastics and/or glass have the benefit that they are insensitive to magnetic and/or electrical fields, such that an optical accelerometer 400 can be obtained that is insensitive to magnetic and/or electrical fields.

Figure 10:
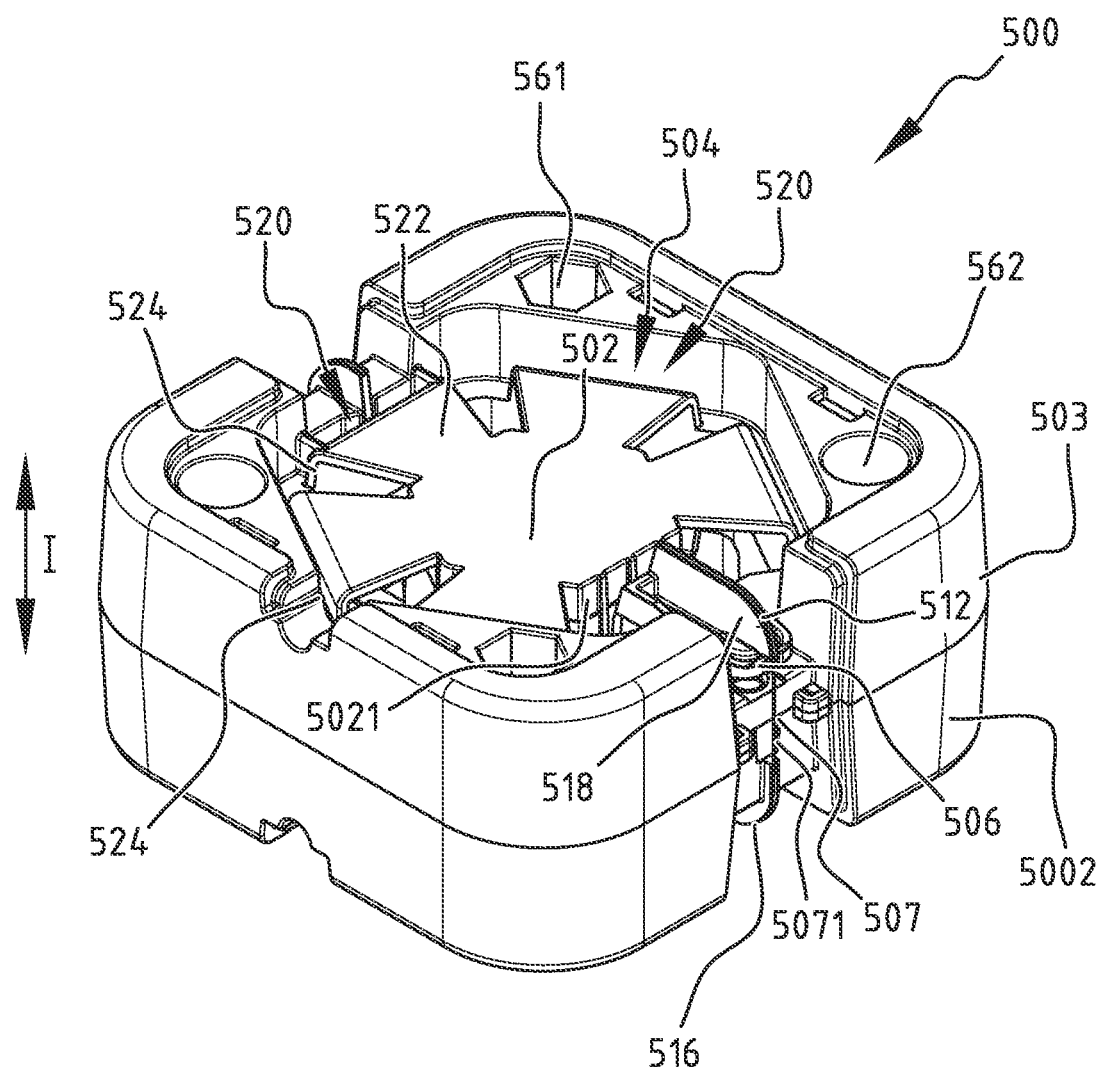
FIG. 10 is a 3D perspective view of an accelerometer according to a fourth embodiment.
Figure 11:
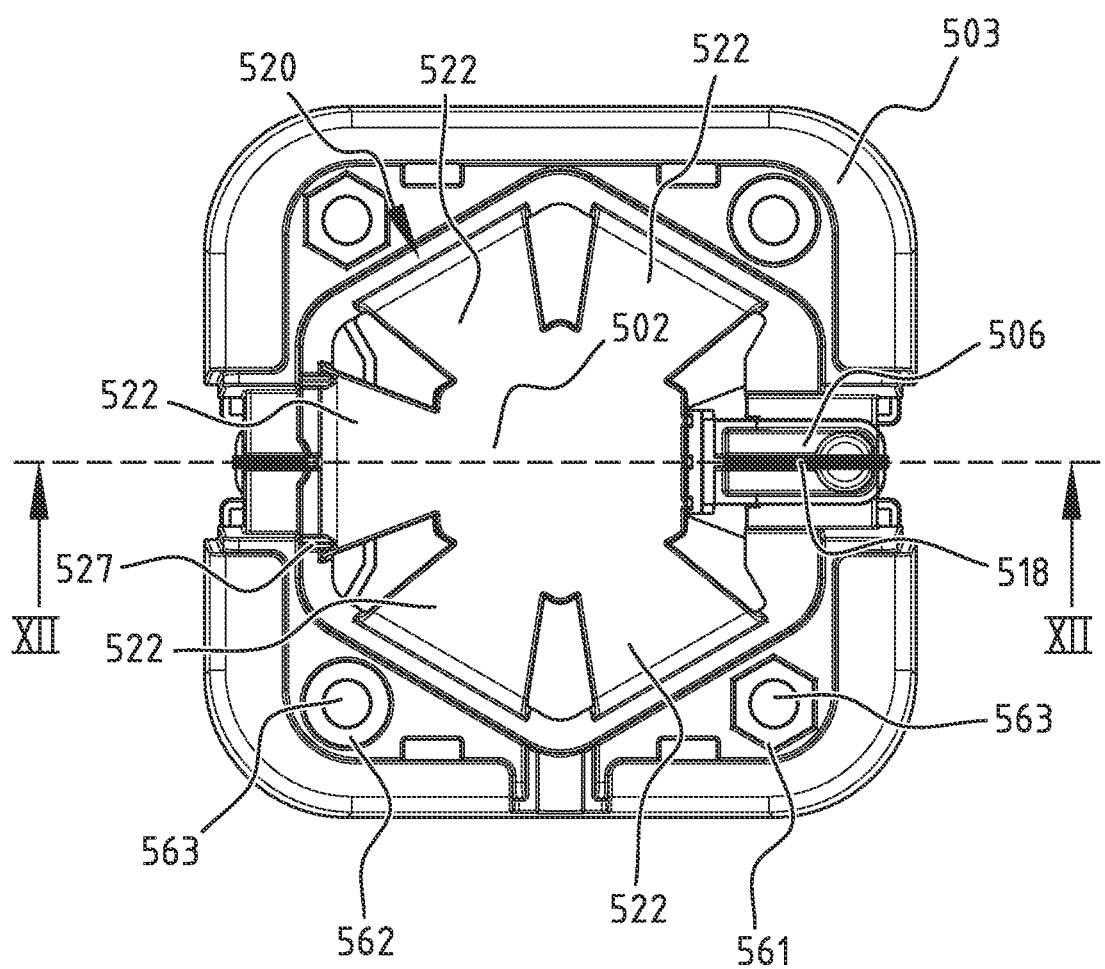
FIG. 11 is a top view of the accelerometer according to the fourth embodiment.

FIG. 10 shows 3D perspective view, and FIG. 11 a top view, of a fourth embodiment of the accelerometer 500. The accelerometer 500 is similar to the previous embodiments. A moving mass 502 is suspended in a frame 503 is such that it is allowed to move only in the measurement direction I. For this, a number of suspension systems 520, in particular five suspension systems 520, each comprising two flexure guide systems 504, are arranged around a central axis L5 of the moving mass 502 that is substantially parallel to the measurement direction I and around an outer circumference of the moving mass 502. The flexure guide systems 520 of accelerometer 500 are similar to the flexure guide systems 420 of the accelerometer 400 according to the third embodiment. They thus comprise a first leaf spring element 522 that is positioned substantially orthogonal to the measurement direction I, such that the first leaf spring element 520 is arranged to bend in a direction substantially parallel to the measurement direction I. The second leaf spring element 524 is again arranged substantially orthogonal to the first leaf spring 522. However, second leaf spring element 524 is relatively short when compared to the second leaf spring element 424 of the third embodiment. Hence, the stiffness of the flexure guide systems 520 is higher in a direction orthogonal to the measurement direction I when compared to the stiffness in a direction parallel to the measurement direction I. At least one flexure guide system 520 can be fitted with further stiffening members 527, which are arranged along the second leaf spring element 524 for stiffening the second leaf spring 524. Note that the stiffness of the leaf springs 522, 524 can be tuned by varying, for instance, the thicknesses, lengths and widths of the spring elements, as has also been described for leaf springs 422, 424 of the third embodiment.

Again, due to the increased number of suspension systems 520 applied, the moving mass 502 is a statically overdetermined system. The arrangement of the flexure guide systems 520, as has been mentioned earlier, allows for effectively absorbing the effects of the over-determination of the moving mass 502.

The frame 503 is provided, at least partially, around the perimeter of the suspension systems 520, thereby shielding, as a housing, the internals of the accelerometer 500. The stiffening members 527 can even be arranged between the frame and the second leaf spring element 524, such that a coupling between the frame 503 and the second leaf spring is obtained. Hereby, the moving mass 502 is further restricted to move only in the measurement direction I.

Similar to the previous embodiments, a transmission system, comprising a pivoting arm 506, is arranged for transferring the movement of the movable mass 502 to a measurement section 5071 of optical fibre 507. The pivoting arm 506 can be arranged at the side of the moving mass opposed from side where the flexure guide system 520 that is fitted with stiffening members 527 is arranged. For increasing the bending stiffness of the pivoting arm 506, a stiffening protrusion 518 is arranged on an outer surface of the pivoting arm 506. Note that the leverage of the pivoting arm 506 is determined similar to the leverage of pivoting arm 406, as is described above. Also note that, as described earlier, it is preferred that the ends 510, 511 of the pivoting arm 506 move substantially only in the measurement direction I.

Figure 12:
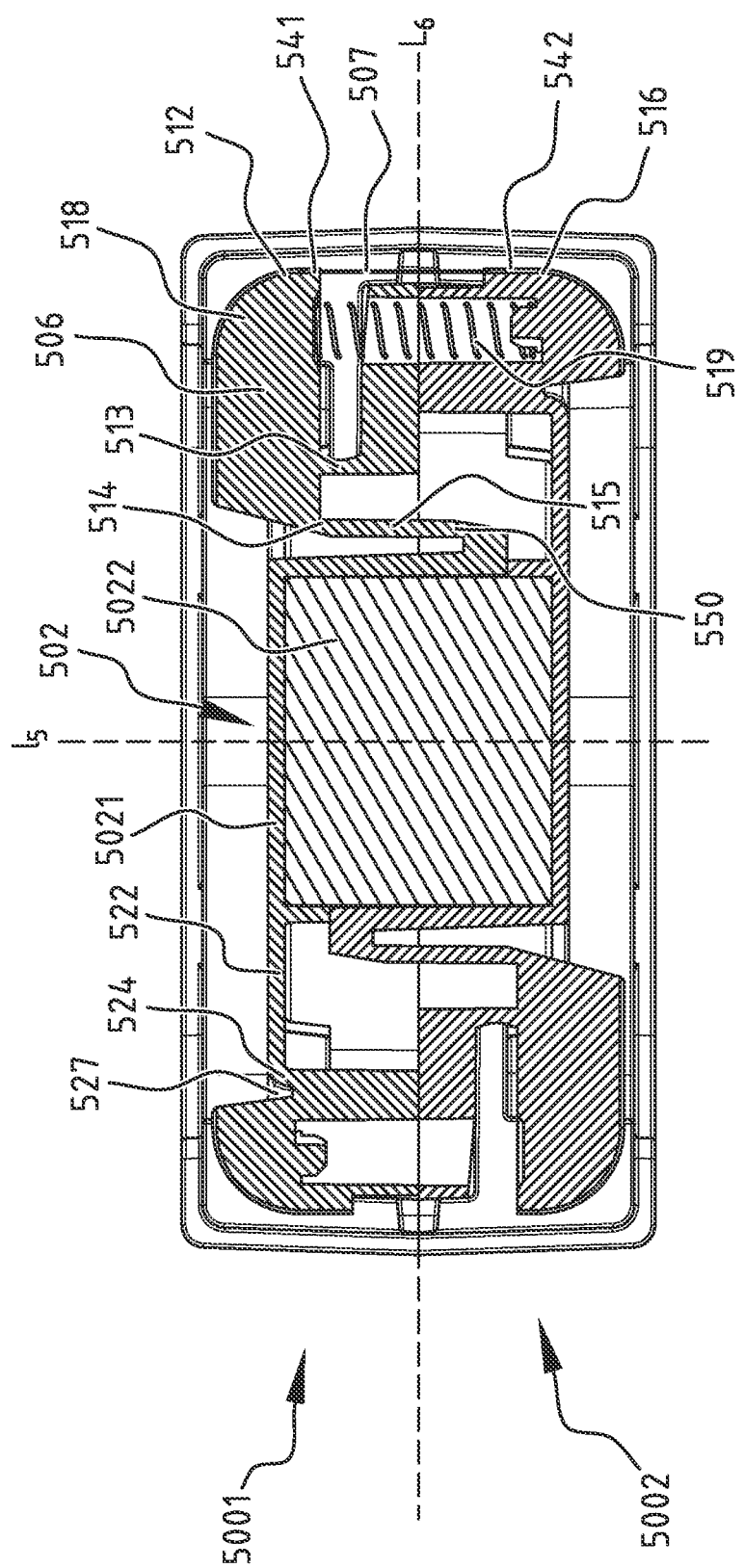
FIG. 12 is a cross-sectional view of the accelerometer according to the fourth embodiment.

A cross-sectional view of the accelerometer 500, according to the FIG. 11, along line XII is shown in FIG. 12. Firstly, it is seen that the moving mass 502 can comprise an additional main moving mass 5022. The main moving mass 5022 is enclosed by a main mass holder 5021. The moving mass 502 is then similar in construction to the construction of the moving mass 402 of the third embodiment of the accelerometer 400. The total stiffness experienced by the moving mass 503, resulting from, amongst others, the suspension systems 504, can be further modified by positioning an elastic element, such as a compression spring 519.

Furthermore, by biasing the elastic element (e.g. the compression spring 519), a base level of tension is applied to the optical fibre 507, whereby an initial strain is introduced. This minimizes the risk that, when the moving mass 502 moves, a zero-strain could occur, whereby a slack in the fibre 507 would occur, which could result in unreliable measurements.

The optical fibre 507 comprises a measurement section 5071, preferably arranged as an FBG, and is arranged similar to the arrangement applied in the other embodiments. Thereby, a first end 541 of the part of the optical fibre comprising measurement section 5071 is connected to the fibre coupling point 512 along an outer smooth surface of the pivoting arm 507. The fibre coupling point 512 is arranged as a channel that runs along this outer smooth surface, such that tight bends of the fibre 507 are prevented. The part of the optical fibre comprising measurement section 5071 is, on a second end 542 thereof, connected to a fibre frame section 516 that is also arranged as a channel that runs along this outer smooth surface. Thereby, the measurement section is arranged in between the fibre coupling point 512 that is arranged to move with the moving mass 502 and the fibre frame section 516 that is arranged to be stationary with respect to the frame 503. Thus, the movement of the moving mass 502 in the measurement direction I results in movement of the fibre coupling point 512, whereby a strain variation is induced in the measurement section that can be measured.

The accelerometer 500, as shown in FIGS. 10-12, can be an assembly comprising at least an optical fibre 507 and two assembly parts 5001, 5002. An additional main moving mass 5022 can again be placed within, and connected to, the moving mass holder 5021, as is also seen in FIG. 12. The moving mass holder 5021 is, for instance, formed by assembling the assembly parts 5001, 5002. The materials used for the accelerometer 500, are equal and/or similar to those mentioned above. Different countersunk extrusions and/or holes, for instance hexagonal 561 or round 562, can be combined with through holes 563, and are provided for positioning and/or holding connecting elements, such as bolts, nuts, rivets and the like, for connecting the assembly parts 5001, 5002 together. Alternatively, or additionally, suitable welding methods (e.g. ultrasonic welding) and/or glue can be used for connecting the assembly parts 5001, 5002 in the assembled state. Additionally, or alternatively, snap-fit type connectors and/or other means of force-closed and/or form-closed connection mechanisms can be applied.

From FIG. 12 it can also be seen that assembly parts 5001, 5002 of the accelerometer 500 can be identical, wherein in the assembled state they are rotated 180 degrees with respect to the virtual dividing line L6, that runs, when seen in a front-view perspective, substantially through a centre of the accelerometer 500, such that it is substantially orthogonal to central axis L5 and they are rotated 180 degrees around central axis L5 with respect to one and another.

Figure 13:
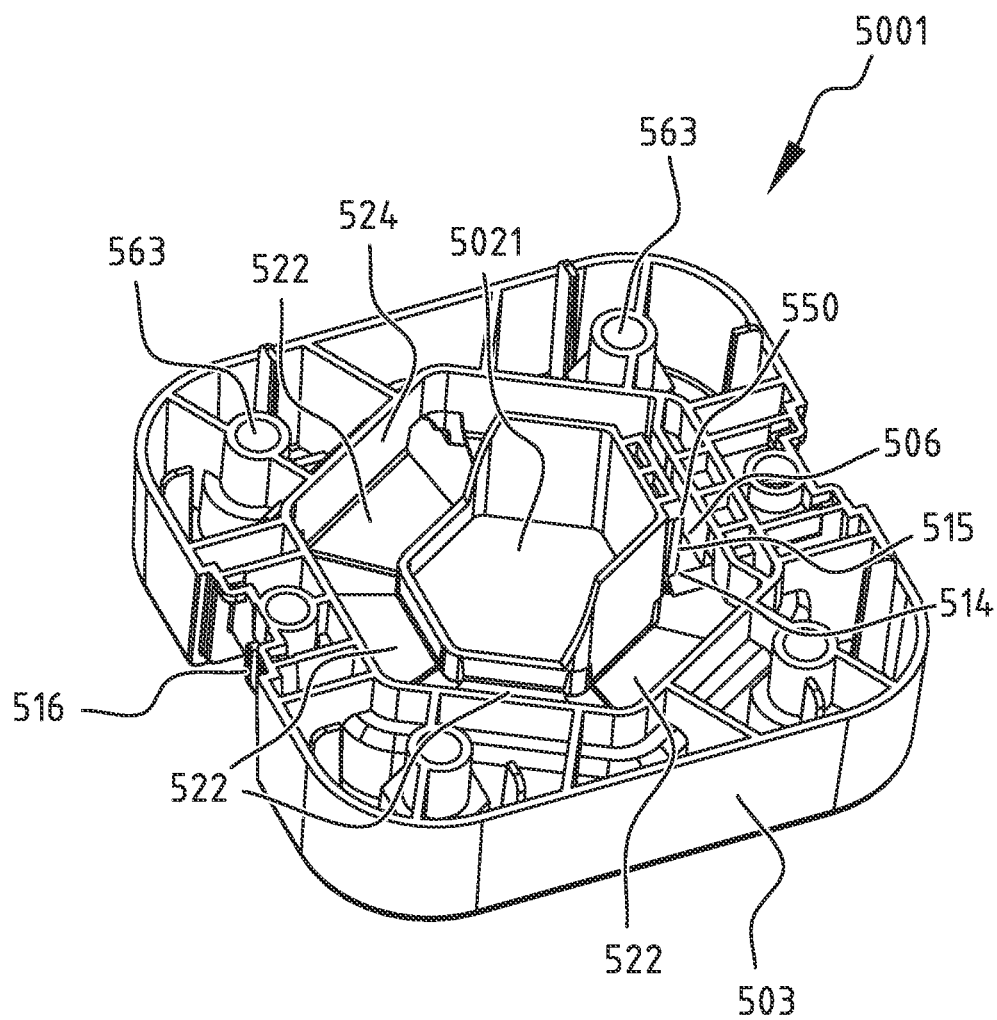
FIG. 13 is a 3D perspective view of an injection moulded part of the accelerometer according to the fourth embodiment.
Figure 14:
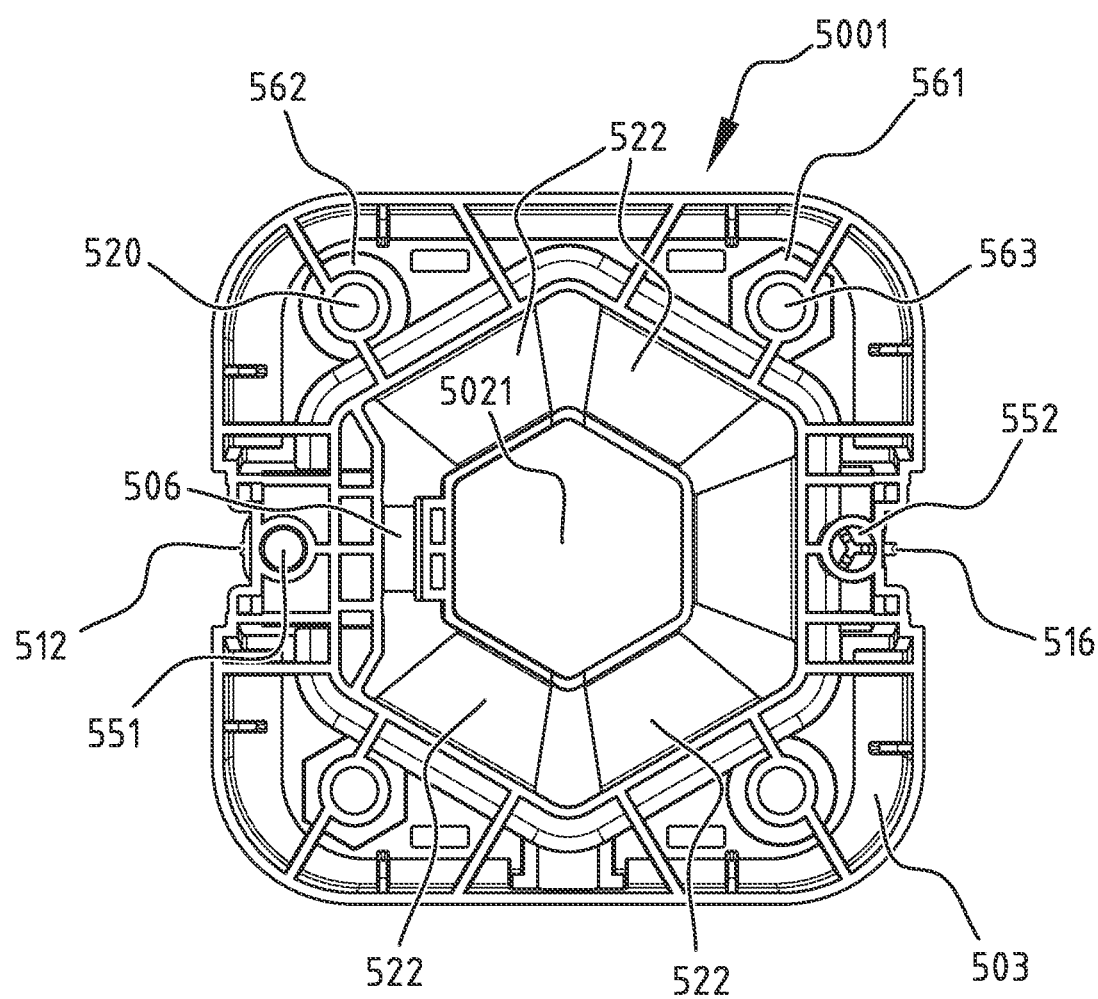
FIG. 14 is a top view of an injection moulded part of the accelerometer according to the fourth embodiment.

FIGS. 13 and 14 show an assembly part 5001 that can be used for the construction of accelerometer 500. By assembling an identical assembly part to assembly part 5001, wherein an additional main moving mass can be provided for obtaining, for instance, the desired sensitivity and frequency range of the accelerometer 500. The optical fibre 507 is then provided as described above. Potentially, a compression spring 519 can be provided in the matching spring placement holes 551, 552 for pre-loading at least the measurement section of the optical fibre.

Figure 15:
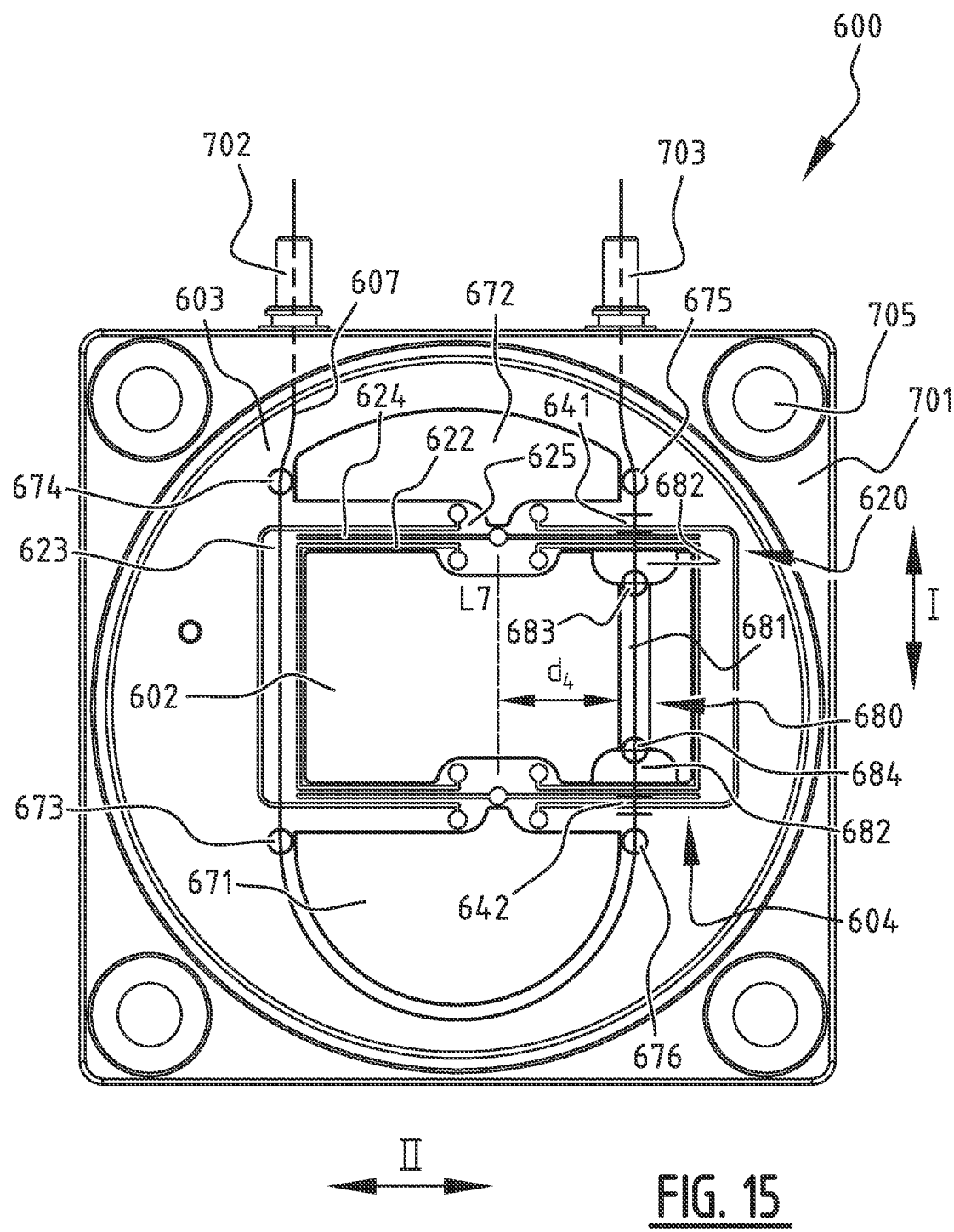
FIG. 15 is a top view of an fifth embodiment of an accelerometer according to the invention.

FIG. 15 shows a front view of a fifth embodiment of the accelerometer. This accelerometer 600 is arranged with a relatively large moving mass 602, such that it is highly suitable for registering low frequency vibrations. Centrally located in the accelerometer 600 is the moving mass 602, which is suspended by means of two suspension systems 604 in the frame 603 such that it can substantially only move in a direction parallel to the measurement direction I. The suspension systems 604, which are formed integral with the moving mass 602 and the frame 603, each comprise two flexure guide systems 620, which are connected by means of the connecting element 621. The flexure guide systems 620 are constructed similarly as the flexure guide systems 120 and flexure guide systems 220, as shown in FIGS. 3-7. Hence, two leaf spring elements 622, 624 that have substantially the same properties, form the legs of the U-shaped flexure guide system 620, whereas the bottoms 623 of the U-shapes, which are integrally formed with the connecting element 621, have a substantially higher bending stiffness, when compared to the leaf spring elements 622, 624.

Similar to the second embodiment, the accelerometer 600 is comprised in a housing 701, for shielding the internal components of accelerometer 600. Housing 701 can be integrally formed with frame 603 from for instance a single block of material, with at least a part of the other parts and/or components, apart from the optical fibre, of accelerometer 600. In this case, the accelerometer 600, apart from the optical fibre 607, is preferably made from a single piece of metal, where the different features (e.g. the suspension system) are formed by means of high-precision milling, EDM, or similar types of highly accurate machining methods. The housing 701 can also be a separate part that is assembled around accelerometer 600, such that the housing 701 and the accelerometer 600 can be made from different materials. Housing 701 can for instance be casted or injection moulded from a suitable plastic, whereas the accelerometer 600 is primarily made from a metal. Hence, an accelerometer according to this embodiment can be produced in a similar, or substantially the same, manner as an accelerometer according to the second embodiment.

Similar to the second embodiment, housing 701 further comprises in- and/or outlet openings 702, 703, that allow for connecting external optical wiring to the accelerometer 600. Through-holes 705 can be arranged, which allow for screwing or otherwise mounting of the accelerometer with housing 700 to a test-object (not shown).

The optical fibre 607 can be mounted in the accelerometer 600, such that it would run in a U-shape (i.e. at least a J-shaped arrangement) from the inlet opening 702, around a first anchor member 671 to the outlet 703. The first anchor member 671 can be arranged, as seen along the measurement direction I and with respect to the moving mass 602, at an opposite end of the frame 603. The first anchor member 671 can thereby serve as a connecting point (i.e. line or body) for connecting optical fibre 607, at for instance connection points 673, 676, to a first part of the frame 3, for instance by means of a glue, adhesive or the like. Between the first anchor member 671 and the outlet 703, the moving mass is arranged for receiving and/or connecting (i.e. directly coupling and/or fixing) the optical fibre in a fibre receiving section 680, for instance at fibre connecting points 683, 684. The receiving section 680 can comprise a channel like portion 681 that runs through the moving mass 602 in a direction parallel to the measurement direction I. The channel like portion 681 is for instance shaped as a recession in a frontal surface of the moving mass, or as a through-hole running through the moving mass. At the respective ends of the channel like portion 681 enlarged recesses 682 can be arranged that can, for instance, aid in the insertion of the optical fibre during assembly and/or for fixating the optical fibre to the moving mass, for instance at fibre connection points 683, 684. By for instance applying wedge-like members that clamp the fibre in these enlarged recessed 682, or by applying adhesives and/or glues at these locations, the fibre 607 can be connected (i.e. fixed) to the moving mass 602. As such, the fibre connection point is arranged in the receiving section 680, preferably as two distinct fibre connection points 683, 684 in the enlarged recessed 682 as described above.

A second anchor member 672 can be arranged on the frame 603, preferably between the moving mass 602 and outlet 703. The optical fibre 607 is then preferably connected, at for instance connecting points 674, 675, to the second anchor member 672 using a glue, adhesive or the like, such that a first free span of the optical fibre 607 that runs from the first anchor member 671 to a fibre connection point on the moving mass and a second free span of the optical fibre that runs from a fibre connection point on the moving mass and the second anchor member 672 have substantially the same length, hereby a movement results in equal strain changes in the fibre. Preferably, the respective fibre connection points 683, 684 are arranged as described above, such that the respective free spans run from the respective anchor members 671, 672 to the respective nearest enlarged recesses 682 of the receiving section 680. In a preferred embodiment both free spans are arranged with respective measurement sections 641, 642, comprising for instance an FBG, such that, with a movement of the moving mass 602, one of the FBGs 641, 642 will register a contraction (i.e. decrease of the strain) of the fibre 607, whereas the other registers an extension (i.e. an increase of the strain) of the fibre 607, which effectively leads to a doubling of the signal. In addition, it allows for compensation of unwanted effects, such as a slow deterioration of any glue or other means of attaching the fibre to the sensor. This deterioration can for instance be creep in the glued connections, whereby the pre-stress in the fibre is slowly reducing over time. As relative measurements can be performed, these effects are compensated for. Additionally, temperature changes can also cause a change in the pre-stress in the fibre, or cause a change in the reflective index of the optical fibre itself, are also compensated for.

In the embodiment of FIG. 15, the receiving section 680 is, as seen in the direction II that is substantially perpendicular to the measurement direction I, arranged at a predefined distance d4 from a centre line L7 of the moving mass 602. The moving mass 602 is hereby not fully symmetric (as seen in the perpendicular direction II) around the centre line L7, such that inertial moments can be generated on the moving mass 602 during while measuring accelerations in the measurement direction I. Nonetheless, as the moving mass 602 is arranged, by use of the suspension systems 604, to only move in the measurement direction I, these inertial moments will lead to negligible, or substantially no, crosstalk on the measurements. In such an arrangement, the fibre can be arranged in the U-shape, while still maintaining a relatively compact arrangement of the accelerometer.

It is noted that, the receiving section 680 and/or fibre connection point(s) can be arranged at substantially any (non-zero) distance of the centre line L7, but also at a zero-distance, such that the centre line L7 and the receiving section 680 and/or fibre connection point(s) substantially overlap.

The present invention is not limited to the embodiment shown, but extends also to other embodiments falling within the scope of the appended claims.

The invention claimed is:

1. An accelerometer for measuring acceleration along a measurement direction, wherein the accelerometer comprises:
    a movable mass which is moving with respect to a frame member only along the measurement direction;
    a suspension system for suspending the movable mass in the frame member while limiting movement of the movable mass to be movement along only the measurement direction; and
    an optical fibre that is connected at a fibre connection point that is coupled to the movable mass, wherein the optical fibre is arranged between the movable mass and the frame member, and wherein the optical fibre comprises a measurement section for measuring the movement of the movable mass along the measurement direction;
    wherein the suspension system comprises two flexure guide systems, each arranged in a U-shape and comprising two leaf springs forming a first leg and a second leg of the U-shape, wherein an intermediate element, having a substantial higher bending stiffness compared to the leaf springs, is arranged between the first leg and a second leg to form a bottom of the U-shape, wherein a free end of the first leg of the U-shape is connected to the frame member and a free end of the second leg of the U-shape is connected to the movable mass; and
    wherein the intermediate elements of the two flexure guide systems are coupled by means of a coupling element having a substantial higher bending stiffness compared to the leaf springs.

2. An accelerometer according to claim 1, further comprising a transmission system comprising at least one pivoting arm coupled between the movable mass and the optical fibre for transmitting the movement of the movable mass to the optical fibre, wherein the optical fibre is connected to the pivoting arm at the fibre connection point, and wherein the pivoting arm has a leverage of at least 2.

3. An accelerometer according to claim 1, wherein the fibre is connected to a first part of the frame member and wherein the measurement section is arranged on a first part of the fibre in between the fibre connection point and the first part of the frame member, wherein the fibre is connected to a second part of the frame member, different from the first part of the frame member.

4. An accelerometer according to claim 1, wherein the flexure guide systems are arranged parallel with respect to each other and the movable mass is allowed to move through a bending of the leaf springs in the measurement direction.

5. An accelerometer according to claim 4, wherein the flexure guide systems each comprise two leaf springs that are arranged in series and wherein at least first leaf springs of the flexure guide systems have substantially the same stiffness and/or thickness, and wherein the first leaf springs of the flexure guide systems are mutually spaced apart in the measurement direction.

6. An accelerometer according to claim 1, wherein the accelerometer comprises an additional suspension system, wherein the suspension systems are arranged on opposite sides of the movable mass and are substantially mirrored over a line, or plane, of symmetry that is substantially parallel to the measurement direction.

7. An accelerometer according to claim 1, wherein the accelerometer comprises a number of suspension systems, wherein the number of suspension systems are arranged around a central axis of the movable mass that is substantially parallel to the measurement direction and around an outer circumference of the movable mass.

8. An accelerometer according to claim 1, comprising an in- and/or outlet section arranged for transferring optical signals to external optical wiring, wherein the optical fibre is routed substantially stress-free from the connection with the pivoting arm to the in- and/or outlet section.

9. An accelerometer according to claim 8, wherein the pivoting arm faces a first side of the frame member and wherein the in- and/or outlet is arranged on a side of the frame member different from the first side, such that a routing of the optical fibre comprises a J-shaped section.

10. An accelerometer according to claim 1, wherein the measurement section comprises a Fibre-Bragg Grating (FBG).

11. An accelerometer according to claim 1, wherein a secondary measurement section is arranged on a part of the optical fibre arranged for not measuring a movement of the movable mass and/or pivoting arm and wherein the secondary measurement section is arranged for measuring a temperature.

12. An accelerometer according to claim 1, wherein the movable mass comprises a movable mass holder and a main movable mass, wherein the movable mass holder is arranged for fixedly holding the main movable mass and wherein the movable mass holder is coupled to the transmission system.

13. An accelerometer according to claim 1, wherein a combination of at least two of the frame member, movable mass, suspension system and transmission system is substantially monolithic.

14. An accelerometer according to claim 12, wherein the accelerometer comprises a plastic and/or synthetic material that is suited for injection moulding, wherein the movable mass holder is made from the plastic and/or synthetic material and wherein the main movable mass comprises a second material with a higher volumetric density.

15. An accelerometer according to 14, wherein the accelerometer comprises two plastic and/or synthetic material parts that are arranged to be assembled and the main movable mass that is arranged to be fixedly coupled to the assembly of the two plastic and/or synthetic material parts, wherein the assembly of the two plastic and/or synthetic material parts comprises the frame, the transmission system, at least one suspension system and the movable mass holder.

16. An accelerometer according to claim 1, wherein the frame member, suspension system and transmission system are formed from substantially a first material, wherein the movable mass comprises the first and a second material and wherein the second material has a higher volumetric mass density than the first material.

17. A method of manufacturing the accelerometer according to claim 1, wherein production of the frame member, movable mass, suspension system and/or transmission system comprises the step of high precision machining, further comprising the step of providing a single piece of material and wherein the step of high precision machine comprises the removal of excess material from the single piece of material by means of electro discharge machining for integrally forming a combination of at least two of the frame member, movable mass, suspensions system and transmission system.

18. A method of manufacturing the accelerometer according to claim 14, comprising the steps of:

injection moulding a first and second plastic and/or synthetic material part;

assembling the first and second plastic and/or synthetic material parts for forming at least a pivoting arm and a frame;

providing an optical fibre comprising a measurement section; and mounting the optical fibre to a fibre connection point of the pivoting arm and to frame, such that the measurement section of the optical fibre is arranged in between the pivoting arm and the frame.

* * * * *